(12) United States Patent
Makino

(10) Patent No.: US 8,683,852 B2
(45) Date of Patent: Apr. 1, 2014

(54) LEAKAGE DIAGNOSTIC DEVICES FOR FUEL VAPOR PROCESSING APPARATUS

(75) Inventor: Katsuhiko Makino, Aichi-ken (JP)

(73) Assignee: Aisan Kogyo Kabushiki Kaisha, Obu-Shi, Aichi-Ken (JP)

( * ) Notice: Subject to any disclaimer, the term of this patent is extended or adjusted under 35 U.S.C. 154(b) by 425 days.

(21) Appl. No.: 13/017,107

(22) Filed: Jan. 31, 2011

(65) Prior Publication Data

US 2011/0186020 A1     Aug. 4, 2011

(30) Foreign Application Priority Data

Feb. 3, 2010   (JP) .................... 2010-021919

(51) Int. Cl.
*F02M 25/08* (2006.01)
*G01M 15/00* (2006.01)

(52) U.S. Cl.
USPC ........ 73/114.39; 123/516; 123/518; 123/519; 123/520

(58) Field of Classification Search
USPC ............ 123/509, 514, 516, 518–520, 198 D; 73/114.39
See application file for complete search history.

(56) References Cited

U.S. PATENT DOCUMENTS

| | | | | |
|---|---|---|---|---|
| 5,911,209 A * | 6/1999 | Kouda et al. | ................... | 123/520 |
| 6,986,341 B2 * | 1/2006 | Mitani et al. | ................... | 123/520 |
| 7,077,112 B2 * | 7/2006 | Mitani et al. | ................... | 123/518 |
| 7,207,209 B2 * | 4/2007 | Mitani et al. | ................... | 73/49.7 |
| 7,313,487 B2 | 12/2007 | Yoshioka et al. | | |
| 7,367,326 B2 * | 5/2008 | Shikama et al. | ............... | 123/520 |
| 2004/0173190 A1 * | 9/2004 | Makino | ........................ | 123/520 |
| 2007/0044549 A1 * | 3/2007 | Yoshioka et al. | ............ | 73/118.1 |
| 2010/0288241 A1 * | 11/2010 | Makino et al. | ................ | 123/521 |
| 2010/0288242 A1 * | 11/2010 | Makino et al. | ................ | 123/521 |
| 2010/0294251 A1 * | 11/2010 | Makino et al. | ................ | 123/519 |
| 2011/0214646 A1 * | 9/2011 | Makino | ........................ | 123/518 |

FOREIGN PATENT DOCUMENTS

| | | |
|---|---|---|
| EP | 1 734 248 A1 | 12/2006 |
| JP | 06 235354 | 8/1994 |
| JP | 6-235354 A | 8/1994 |
| JP | 06 235355 | 8/1994 |
| JP | 2002 235608 | 8/2002 |
| JP | 2002 317710 | 10/2002 |
| JP | 2004-92510 A | 3/2004 |
| JP | 2005 120913 | 5/2005 |

(Continued)

OTHER PUBLICATIONS

Non-English Action dated Apr. 16, 2013 for Application No. JP 2010-021919 and an English-language version.

(Continued)

*Primary Examiner* — Stephen K Cronin
*Assistant Examiner* — Joseph Dallo
(74) *Attorney, Agent, or Firm* — Ladas & Parry LLP

(57) ABSTRACT

A leakage diagnosis device can determine whether or not leakage occurs from a fuel vapor processing apparatus by comparing a diagnosis criterion, such as a reference pressure set for diagnosing leakage, with an internal pressure of a process system of the fuel vapor processing apparatus during application of a negative or positive pressure to the process system. The diagnosis criterion has a device that can correct the diagnosis criterion based on a fuel vapor pressure within the process system.

10 Claims, 10 Drawing Sheets

(56) References Cited

FOREIGN PATENT DOCUMENTS

| JP | 2005-299394 A | 10/2005 |
| JP | 2007 247500 | 9/2007 |
| JP | 2009 119845 | 6/2009 |
| JP | 2009-198444 A | 9/2009 |
| JP | 2009-198450 A | 9/2009 |
| JP | 2009-204322 A | 9/2009 |

OTHER PUBLICATIONS

Patent Abstracts of Japan English abstract of JP 6-235354 A.
Patent Abstracts of Japan English abstract of JP 2009-204322 A.
Patent Abstracts of Japan English abstract of JP 2009-198450 A.
Patent Abstracts of Japan English abstract of JP 2009-198444 A.
Patent Abstracts of Japan English abstract of JP 2004-92510 A.
Patent Abstracts of Japan English abstract of JP 2005-299394 A.

* cited by examiner

LEAKAGE DIAGNOSTIC DEVICES FOR FUEL VAPOR PROCESSING APPARATUS

This application claims priority to Japanese patent application serial number 2010-021919, the contents of which are incorporated herein by reference.

BACKGROUND OF THE INVENTION

1. Field of the Invention

The present invention relates to leakage diagnostic devices for fuel vapor processing apparatus.

2. Description of the Related Art

Known vehicles that run on gasoline or like fuel have a fuel vapor processing apparatus that can prevent fuel vapor from being dissipated to the atmosphere while preventing damage on a fuel tank due to increase of an internal pressure of the fuel tank. However, if the fuel vapor processing apparatus is cracked or has an improper seal portion, it may be possible that fuel vapor may leak from the processing system. An operator cannot directly recognize occurrence of such leakage of fuel, vapor. Therefore, a diagnostic device for diagnosing occurrence of leakage from a fuel vapor processing device has been proposed, for example, in Japanese Laid-Open Patent Publication No. 6-235354.

The fuel vapor processing apparatus disclosed in the above publication incorporates an evaporation purge system communicating between a canister and an intake air passage of an engine for desorbing fuel vapor from the canister by a negative pressure produced as an intake air is introduced into the engine, and for purging the desorbed fuel vapor into the engine. On this condition, the diagnostic device diagnoses leakage by applying a negative pressure produced by the intake air to the entire process system including a fuel tank. That is, the intake air passage (intake air) is used as means for desorbing the fuel vapor and for applying the pressure. The leakage diagnosis is made, based on a result of detection of a pressure by an internal pressure sensor (pressure detecting device), from a pressure reducing ratio within the process system due to the application of the negative pressure or a pressure increasing ratio resulting when. the process system is closed under the negative pressure condition. However, the pressure of the fuel vapor may influence the internal pressure within the process system. Therefore, in order to avoid wrong diagnosis that may be caused by change of the fuel vapor pressure, a second embodiment disclosed in the above publication has proposed to correct a diagnosis reference pressure for leakage based on an amount of production of fuel vapor (or a fuel vapor pressure), which is predicted from a temperature of the fuel within a fuel tank.

More specifically, when a negative pressure is applied to the process system, as indicated by a solid line in FIG. 13, an internal pressure P (measured value) within the process system gradually decreases and then gradually increases (i.e., returns to the side of the atmospheric pressure) due to generation of the fuel vapor again even if the process system is closed under the negative condition to maintain a negative pressure. If the internal pressure P at diagnosis timing T1 during application of the negative pressure or that at diagnosis timing T2 during maintaining the negative pressure is less than a reference pressure Pm that is a reference for diagnosis of leakage, it is determined that no leakage occurs. On the other hand, if leakage occurs from the fuel vapor processing apparatus, an external air may flow into the process system. Therefore, the internal pressure P gently reduces during the application of the negative pressure as indicated by a one-dot chain line in FIG. 13. During maintaining the negative pressure, the internal pressure P rapidly increases as indicated by a two-dot chain line in FIG. 13. Therefore, at the diagnosis timing T1 during application of the negative pressure, the internal pressure P is lower than the reference pressure Pm, while at the predetermined diagnosis timing T2 during maintaining the negative pressure, the internal pressure P is higher than the reference pressure Pm. By using this, it is determined that leakage occurs if the internal pressure P of the process system during application of the negative pressure or during maintaining the negative pressure is higher than the reference pressure Pm.

However, this leakage diagnosis technique using application of the negative pressure may not provide a correct diagnosis result depending on the fuel temperature or the vaporization condition of the fuel in the process system. The fuel temperature may increase due to the external temperature or heat produced during driving of a fuel pump that pumps the fuel to be supplied to an engine. If the fuel temperature increases, the fuel may be easily vaporized to cause increase of the fuel vapor pressure as shown in FIG. 14. This may cause increase of the internal pressure within the process system. In such a case, as indicated by a dashed line (broken line) in FIG. 13, the internal pressure P varies while maintaining a high pressure level. Therefore, it may be possible that the internal pressure P at the diagnosis timings T1 or T2 becomes higher than the reference pressure P even during application of the negative pressure. Therefore, even in the case that no leakage occurs from the fuel vapor processing apparatus, a wrong diagnosis is made to determine that leakage occurs. To this end, according to the second embodiment of the above publication, the reference pressure Pm is corrected by predicting an amount of production of fuel vapor (or a fuel vapor pressure) from a temperature of the fuel within the fuel tank.

The same problem as described above may be caused also in the case that leakage diagnosis is made by applying a positive pressure to the process system. Thus, in the case that a positive pressure is applied to the process system, the internal pressure P gradually increases as indicated by a solid line in FIG. 15. If the internal pressure P at diagnosis timing T1 during application of the positive pressure or that at diagnosis timing T2 during maintaining the positive pressure is higher than a reference pressure Pp, it may be determined that no leakage occurs. If leakage occurs from the fuel vapor processing apparatus, gas within the process system may flow out of the process system. Therefore, the internal pressure P gently increases during the application of the positive pressure as indicated by a one-dot chain line in FIG. 15. During maintaining the positive pressure, the internal pressure P is lowered as indicated by a two-dot chain line in FIG. 15. Therefore, at the diagnosis timing T1 during application of the positive pressure, the internal pressure P is lower than the reference pressure Pp, and also at the predetermined diagnosis timing T2 during maintaining the positive pressure, the internal pressure P is lower than the reference pressure Pp. By using this, it is determined that leakage occurs if the internal pressure P of the process system during application of the positive pressure or during maintaining the positive pressure is lower than the reference pressure Pp.

However, also in the case of leakage diagnosis made by applying the positive pressure, because the fuel vapor pressure increases as the fuel temperature increases, the internal pressure P within the process system varies while maintaining a high pressure level as indicated by a dashed line (broken line) in FIG. 15. Therefore, even in the case that leakage occurs from the fuel vapor processing apparatus, it may be possible that the internal pressure P at the diagnosis timings T1 becomes higher than the reference pressure Pp although the internal pressure P gently increases during application of the positive pressure. In addition, even in the case that leakage occurs from the fuel vapor processing apparatus, it may be possible that the internal pressure P at the diagnosis timings T2 becomes higher than the reference pressure Pp although the internal pressure P decreases during application of the positive pressure. In this way, it may be possible that the internal pressure P is higher than the reference pressure Pp at the timings T1 and T2 in the case that the positive pressure is applied when the fuel temperature is high. Thus, there is also a problem that a wrong diagnosis is made to determine that no leakage occurs even in the case that leakage occurs.

Incidentally, Japanese Laid-Open Patent Publication No. 2002-235608 proposes a fuel, vapor processing apparatus incorporating an aspirator that can produce a negative pressure by utilizing a part of fuel discharged from a fuel pump without using the intake air passage (negative pressure of intake air). According to the fuel vapor processing apparatus of this publication, the aspirator communicates with the fuel pump via a pressure regulator for regulating the pressure of the fuel, while a decompression chamber of the aspirator communicates with a canister. Therefore, a negative pressure produced by introducing surplus fuel from the pressure regulator into the aspirator is applied to the canister, and the fuel vapor within the canister is recovered into the fuel tank via the aspirator. Thus, the fuel vapor processing apparatus of this reference incorporates a purge-less evaporation system in which the fuel vapor is recovered into the fuel tank without being purged into the intake air passage.

As described above, according the technique of Japanese Laid-Open Patent Publication No. 6-235354, the reference for diagnosis of leakage is corrected by predicting the fuel vapor pressure from the fuel temperature. However, although the fuel vapor pressure has a correlation with the fuel temperature, fuel, such as gasoline, is a mixture of various kinds of hydrocarbons. Therefore, as shown in FIG. 14, the fuel vapor pressure has a characteristic that may vary according to the kind (composition) of fuel. In general, lighter fuel has a higher fuel vapor pressure, while heavier fuel has a lower fuel vapor pressure. The pressure characteristic also may vary according to the storing condition (degradation condition) of the fuel. In the technique of the Publication No. 6-235354, the fuel vapor pressure is predicted only from the fuel temperature, and no actual temperature is measured. Therefore, it is likely that there is a difference between the fuel vapor pressure predicted from the fuel temperature and the actual fuel vapor pressure of the fuel that is being used. This does not allow to accurately correct the reference for diagnosis, leading to a wrong diagnosis of leakage.

In the case of Japanese Laid-Open Patent Publication No. 2002-235608, the fuel, vapor is recovered from the canister by using the aspirator. However this publication does not disclose a technique of diagnosing leakage from the fuel vapor processing apparatus.

Therefore, there is a need in the art for a leakage diagnosis device that can accurately determine whether or not leakage occurs regardless of change of the kind of fuel.

SUMMARY OF THE INVENTION

A leakage diagnosis device can determine whether or not leakage occurs from a fuel vapor processing apparatus by comparing a diagnosis criterion, such as a reference pressure set for diagnosing leakage, with an internal pressure of a process system of the fuel vapor processing apparatus during application of a negative or positive pressure to the process system. The diagnosis criterion has a device that can correct the diagnosis criterion based on a fuel vapor pressure within the process system.

DETAILED DESCRIPTION OF THE INVENTION

Figure 1:
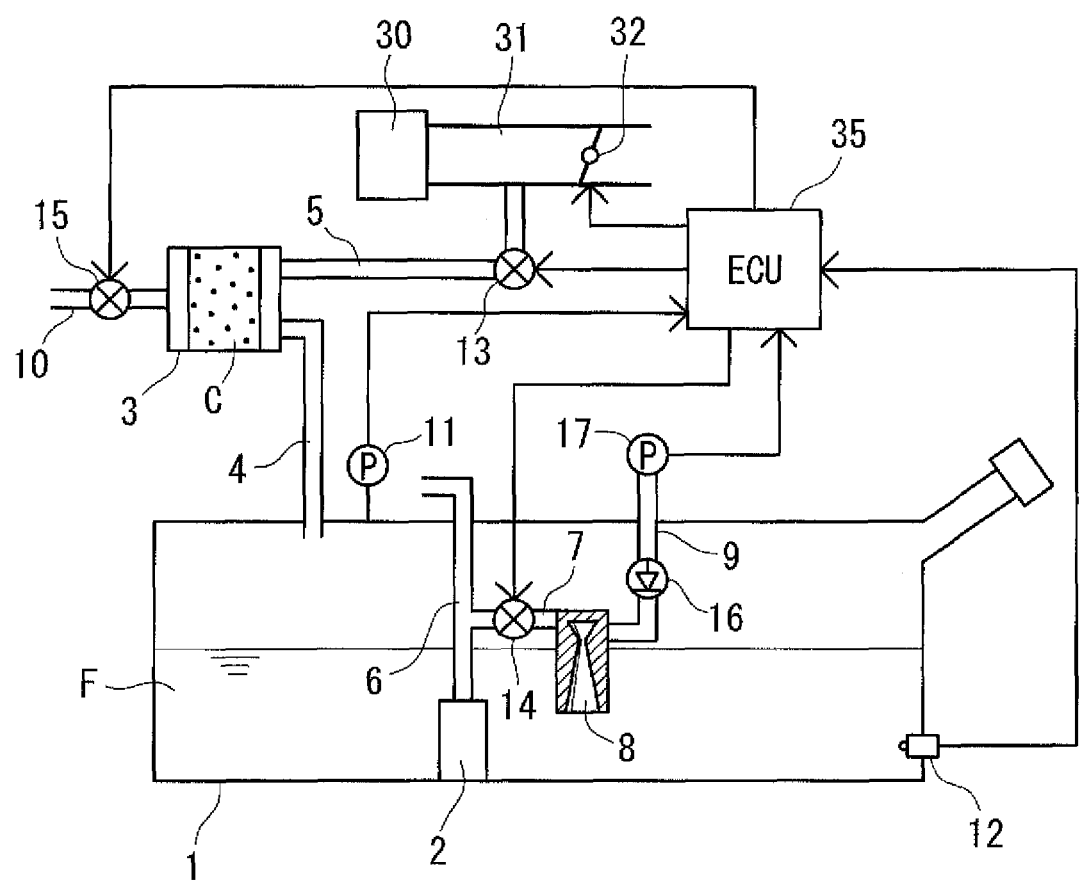
FIG. 1 is a schematic view showing a fuel vapor processing apparatus and a leakage diagnosis device incorporated thereinto according a first example.

Each of the additional features and teachings disclosed above and below may be utilized separately or in conjunction with other features and teachings to provide improved diagnosis devices and systems having fuel vapor processing apparatus incorporating such diagnosis devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

In one example, a leakage diagnosis device for diagnosing leakage from a fuel vapor processing apparatus is provided. The fuel vapor processing apparatus includes a fuel tank, a fuel pump, a canister adsorbing fuel vapor produced within the fuel tank, a fuel vapor desorbing device for desorbing fuel vapor from the canister by applying a negative pressure to the canister. The leakage diagnosis device includes a pressure applying device having the fuel vapor desorbing device and capable of applying a pressure to a process system of the fuel vapor processing apparatus, a pressure detecting device detecting an internal pressure of the process system when the pressure apply device apples a pressure to the process system, a fuel vapor pressure determining device for determining a fuel vapor pressure, and a leakage determining device determining the presence of leakage based on a result of detection of the internal pressure of the process system with reference to a diagnosis reference and capable of correcting the diagnosis reference according to the fuel, vapor pressure determined by the fuel vapor pressure determining device. The fuel vapor pressure determining device includes an aspirator having a decompression chamber in which a part of fuel discharged from the fuel pump is used for producing a negative pressure, a negative pressure detecting device for detecting the negative pressure produced by the aspirator, and a fuel vapor pressure calculating device for calculating the fuel vapor pressure based on the result of detection by the negative pressure detecting device. Here, the term "process system" is used to mean a system in which fuel vapor may exist during processing the fuel vapor and the system may include the fuel tank, the canister or any other parts, and passages communicating with these parts.

A part of fuel discharged from the fuel pump may be introduced into the aspirator, so that the aspirator produces a negative pressure by a venturi effect at the decompression chamber. The part of fuel introduced into the decompression chamber is decompressed and vaporized, so that a fuel vapor pressure is produced. Therefore, the negative pressure produced by the aspirator is brought to be balanced with the fuel vapor pressure of the introduced fuel. The negative pressure of the aspirator at the balanced state is detected by the negative pressure detecting device and the fuel vapor pressure is calculated by the fuel vapor pressure calculating device from the result of detection by the negative pressure detecting device. Thus, the fuel vapor pressure can be calculated because the negative pressure produced by the aspirator varies with change of the property of the fuel. In other words, the fuel vapor pressure can be identified from the negative pressure produced by the aspirator. Because the fuel vapor pressure is determined by the fuel vapor pressure determining device in this example, it is possible to correctly measure the fuel vapor pressure that may vary with change of the fuel used. Therefore, it is possible to accurately correct the diagnosis reference (reference pressure) according to the fuel vapor pressure, and it is possible to avoid a wrong diagnosis of leakage even in the case that the fuel is at a high temperature.

The leakage diagnosis device may further include a fuel temperature detecting device for detecting a fuel temperature. The fuel vapor pressure is a function of the fuel temperature. Therefore, if the temperature of fuel introduced into the aspirator is not stable, it may be possible to cause an error in the measured (calculated) fuel vapor pressure. Therefore, the fuel vapor pressure calculating device calculates the fuel vapor pressure based on the result of detection by the negative pressure detecting device and the fuel temperature detected by the fuel temperature detecting device, so that it is possible to correctly calculate the fuel vapor pressure in response to change of the fuel temperature. Hence, it is possible to more accurately correct the diagnosis reference to reliably avoid an error in the leakage diagnosis. Preferably, the fuel temperature is detected before vaporization (in a liquid state), because it is possible to more accurately obtain the fuel temperature than in the case of detection of the temperature of the vaporized fuel.

The decompression chamber of the aspirator may communicate with the outside of the fuel tank while the aspirator communicating with the fuel pump. The outside of the fuel tank may be the atmosphere or may be the canister. It may be preferable that the atmospheric air is introduced into the fuel tank by utilizing the negative pressure produced by the aspirator, so that a positive pressure is applied into the fuel tank. Thus, the aspirator also serves as the pressure applying device, so that the negative pressure produced by the aspirator is used for introducing the atmospheric air into the fuel tank in order to apply a positive pressure into the fuel tank for diagnosing leakage from the process system. Therefore, it is possible to efficiently perform the leakage diagnosis. In order to achieve a negative pressure within the fuel tank in the evaporation purge system by using a negative pressure of an intake air supplied to an engine, it is necessary to apply the negative pressure though the canister to apply the negative pressure to the entire process system. In such a case, because a region to which the negative pressure is applied by a single pressure applying device is large (i.e., an amount of air to be discharged is large), it takes a long time for achieving the negative pressure throughout the process system. On the other hand, in the case that the aspirator is used as the pressure applying device, it is possible to achieve a positive pressure within the fuel tank while the engine intake air being used for achieving a negative pressure within the canister. Therefore, the leakage diagnosis can be quickly and efficiently performed. In the case that the decompression chamber of the aspirator is brought to communicate with the canister, the atmospheric air may be introduced into the fuel tank via the canister.

In the case that the decompression chamber of the aspirator communicates with the canister instead of the atmosphere, it may be possible to constitute a purge-less evaporation system, in which the fuel vapor adsorbed by the canister is desorbed by the negative pressure produced by the aspirator and is then recovered into the fuel tank. In other words, the aspirator also serves as the fuel vapor desorbing device. Therefore, it is not necessary to provide the fuel vapor pressure determining device as a separate device from the aspirator in the case of a purge-less evaporation system incorporating the aspirator. Therefore, it is possible to avoid increase in size and manufacturing cost of the fuel vapor processing apparatus.

In such a case, in order to make the leakage diagnosis, the canister may be disconnected from the atmosphere, and fuel vapor adsorbed by the canister may be desorbed by the negative pressure produced by the aspirator so as to be recovered into the fuel tank, so that the leakage diagnosis can be made with the internal pressure of the canister kept at a negative pressure while the internal pressure of the fuel tank kept at a positive pressure. Therefore, the aspirator can be used as the pressure applying device in addition to the use as the fuel vapor pressure determining device and the fuel vapor desorbing device. Because the decompression chamber of the aspirator communicates with the canister, gas (a mixture of air and fuel vapor) is drawn from the side of the canister into the fuel tank as the fuel is introduced into the aspirator from the fuel pump. Therefore, with the operation of the aspirator, the internal pressure of the canister naturally tends to become negative, while the internal pressure of the fuel tank tends to become positive. For this reason, the operation of the aspirator can be effectively utilized for diagnosing the leakage with the internal pressure of the fuel tank kept at a positive pressure and with the internal pressure of the canister kept at a negative pressure. On the contrary, if the diagnosis is made with the internal pressure of the fuel tank kept at a negative pressure and with the internal pressure of the canister kept at a positive pressure, it is necessary to use a pressure applying device, such as a gaseous-phase pump, that is a separate device from the aspirator, leading to inefficiency and increase in size and cost of the apparatus. If the diagnosis is made by applying a positive pressure to the entire process system, it is necessary to discharge of a large amount of air from the fuel vapor processing apparatus after the diagnosis process. On the other hand, if the internal pressure of the fuel tank is kept at a positive pressure and the internal pressure of the canister is kept at a negative pressure, it is possible to minimize an amount of air discharged from the apparatus after the diagnosis process. In addition, it is possible to minimize the leakage of fuel vapor. Furthermore, because setting the internal pressure of the canister to a negative pressure and setting the internal pressure of the fuel tank to a positive pressure can be made at the same time, the leakage diagnosis can be quickly and efficiently made.

Various examples will now be described with reference to the drawings. The examples relate to diagnosis devices for diagnosing leakage from fuel vapor processing apparatus. The diagnosis devices explained in the following examples may be used for any other fuel vapor processing apparatus than disclosed in the examples as long as the fuel vapor processing apparatus have a basic construction including a fuel tank, a canister and a fuel vapor desorbing device. Thus, the fuel, vapor processing apparatus may include additional components that are not disclosed in the examples. Although the fuel vapor processing apparatus of the examples can be used for processing volatile fuel, such as gasoline, they may also be used for processing any other fuel.

FIRST EXAMPLE

A first example will be described in connection with a leakage diagnosis device applied to a fuel vapor processing apparatus that incorporates an evaporation purge system utilizing an intake air pressure. Referring to FIG. 1, the fuel vapor processing apparatus of this example generally includes a fuel tank 1 for storing fuel F, a fuel pump 2 for pumping the fuel F stored within the fuel tank 1 and feeding the fuel F to an internal combustion engine 30 under pressure, and a canister 3 capable of adsorbing fuel vapor produced within the fuel tank 1. Reference numeral 31 denotes an intake air passage for supplying intake air to the engine 30. Reference numeral 32 denotes a throttle valve that can control the amount of intake air or the flow rate of the intake air according to the stepping amount of an accelerator pedal of a vehicle (not shown). The fuel tank 1 and the canister 3 communicate with each other via a vapor passage 4. The canister 3 and the intake air passage 31 communicate with each other via a purge passage 5. The purge passage 5 is connected to the intake air passage 31 at a position on the downstream side of the throttle valve 32. One end (on the side opposite to the engine 30) of the intake air passage 31 is opened into the atmosphere via an air filter (not shown). The fuel pump 2 is disposed within the fuel tank 1 and pumps the fuel F to be fed to the engine 30 via a fuel supply passage 6. A branch passage 7 is branched off from the fuel supply passage 6. An aspirator 8 is disposed at a downstream end of the branch passage 7. Therefore, the aspirator 8 communicates with the fuel pump 2 via the fuel supply passage 6 and the branch passage 7. A suction passage 9 has one end connected to a decompression chamber 43 (see FIG. 2) of the aspirator 8 and has the other end opened into the atmosphere. Thus, the decompression chamber 43 of the aspirator 8 communicates with outside of the fuel tank 1 via the suction passage 9. An atmospheric passage 10 has one end connected to the canister 3 and has the other end opened into the atmosphere.

A pressure sensor 11 serving as a pressure detecting device is disposed at the fuel tank 1 for detecting an internal pressure of a process system including the fuel tank 1. The pressure sensor 11 may be positioned at any position as long as it can detect the internal pressure of the process system. For example, the pressure sensor 11 may be disposed at the canister 3, the vapor passage 4 or the purge passage 5. A fuel temperature sensor 12 serves as a fuel temperature detecting device and can detect the temperature of the fuel F. The fuel temperature sensor 12 is also disposed at the fuel tank 1. However, the fuel temperature sensor 12 may be disposed at any position as long as it can detect the temperature of the fuel F. For example, the fuel temperature sensor 12 may be disposed at the fuel supply passage 6, the branch passage 7 or the aspirator 8. If the fuel temperature sensor 12 is disposed at the aspirator 8, it is possible to detect the fuel temperature immediately before vaporization, which may influence the measurement of the fuel vapor pressure. Therefore, an accurate correction of the measured fuel vapor pressure can be made. In the case that the fuel temperature sensor 12 is disposed at the aspirator 8, the fuel temperature sensor 12 may be mounted to a nozzle portion 45 of the aspirator 8. Detections signals outputted from the pressure sensor 11 and the fuel temperature sensor 12 may be inputted into an engine control unit (ECU) 35 that may include a CPU, a ROM and a RAM, etc. As will be explained later in detail, a predetermined control program may be stored in the ROM, and based on the control program, the CPU may control various components at predetermined timings and may perform various computing processes.

An adsorption material C is filled within the canister 3 and may be activated carbon or any other suitable material that allows passage of air but can absorb the fuel vapor. In the purge passage 5, a purge passage valve 13 is provided as an opening and closing device for switching between a communicating condition and a shut-off condition of the purge passage 5. A branch passage valve 14 is provided in the branch passage 7 as a fuel introduction control device for switching between an introduction state and a shut-off state for the flow of the fuel into the aspirator 8. Such a fuel introduction control device may be provided at the aspirator 8 in place of the branch passage 7. For example, a needle valve may be provided in the aspirator 8 for controlling the injection timing of the fuel from a nozzle body 46 (see FIG. 2). An atmospheric passage valve 15 is provided in the atmospheric passage 10 as an opening and closing device for switching between a communicating condition and a shut-off condition of the atmospheric passage 10. The purge passage valve 13, the branch passage valve 14 and the atmospheric passage valve 15 may be solenoid valves, the opening and closing timings of which are controlled by the ECU 35. In this first. example, a diagnosis is made for determining whether or not leakage of gas, in particular fuel vapor, may occurs from the process system that is constituted by a closeable continuous space extending from within the fuel tank 1 to the atmospheric passage valve 15 via the purge passage valve 13. Thus, the process system is defined by a space within the fuel tank 1, a space within the canister 3, the vapor passage 4, the purge passage 5 and the atmospheric passage 10.

A check valve 16 is provided in the suction passage 9 for preventing backflow of the fuel F. A negative pressure sensor 17 serving as a negative pressure detecting device is provided at one end of the suction passage 9 for detecting a negative pressure that may be produced by the aspirator 8. A sensor having the same construction as the pressure sensor 11 can be used for the negative pressure sensor 17. The negative pressure sensor 17 may be provided at any position as long as it can detect the negative pressure produced by the aspirator 8. For example, the negative pressure sensor 17 may be provided at a midway point of the suction passage 9 or may be provided at the aspirator 8 other than the end of the suction passage 9. In the case that the negative pressure sensor 17 is provided at the aspirator 8, it may be preferable that the negative pressure sensor 17 is mounted to be opposed to the decompression chamber 43. Also, the detection signal from the negative pressure sensor 17 is inputted into the ECU 35. Although not described in detail, the ECU 35 may calculate a fuel vapor pressure based on the result of detection by the negative pressure sensor 17. Therefore, the aspirator 8, the negative pressure sensor 17 and the ECU 17 constitute a device for determining the fuel vapor pressure.

Figure 2:
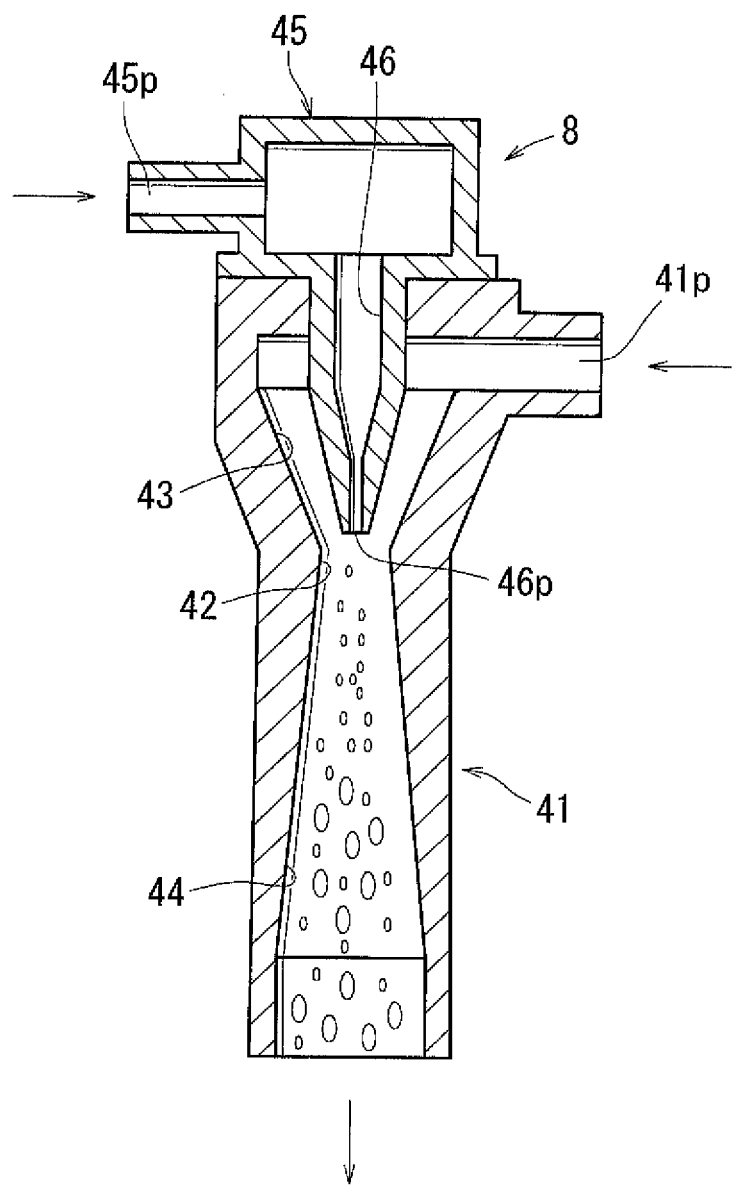
FIG. 2 is a vertical sectional view of an aspirator shown in FIG. 1.

As shown in FIG. 2, the aspirator 8 includes a venturi portion 41 and the nozzle portion 45. The venturi portion 41 includes a throttle 42, the decompression chamber 43 disposed on the upstream side (with respect to the flow of the fuel) of the throttle 42 and gradually narrowing toward the downstream side, and a diffuser portion 44 disposed on the downstream side of the throttle 42 and gradually broadening toward the downstream side. The decompression chamber 43, the throttle 42 and the diffuser portion 44 have the same axis. A suction port 41p is formed to communicate with. the decompression chamber 43. The suction passage 9 is connected to the suction port 41p. The nozzle portion 45 is joined to an upstream side part of the venturi portion 41. The nozzle portion 45 has an introduction port 45p for introducing the fuel into the aspirator 8 and the nozzle body 46 for injecting the introduced fuel. The nozzle body 46 is disposed coaxially within the decompression chamber 43 and has an injection opening 46p opposed to the throttle 42.

A part of the fuel F discharged from the fuel pump 2 is introduced into the aspirator 8 from the fuel introduction port 45p via the fuel supply passage 6 and the branch passage 7. Then, the introduced fuel F is injected from the nozzle body 46 and flows axially through the central portions of the throttle 42 and the diffuser portion 44 at a high speed. At the same time, a negative pressure is produced at the decompression chamber 43 by the venturi effect. Therefore, a suction force is applied to the suction port 41p and the suction passage 9, so that gas (that is atmospheric air in the case of the first example, but is a mixture of the evaporated fuel and air from the canister 3 in the case of a second example that will be explained later) may be drawn from the suction passage 9 via the suction port 41p, mixed with the fuel F injected from the nozzle body 46 and then discharged from the diffuser portion 44.

A mechanism for processing the fuel vapor by the fuel vapor processing apparatus constituted as described above will be now explained. The atmospheric passage valve 15 is opened during a normal condition (OFF state). On the other hand, the purge passage valve 13 and the branch passage valve 14 are closed during the normal condition. When the internal pressure within the fuel tank 1 is increased due to production of fuel vapor during stopping of the vehicle engine or due to filling of fuel into the vehicle, gas (a mixture of air and fuel vapor) within the fuel tank 1 may flow into the canister 3 via the vapor passage 4. Then, the fuel vapor is selectively adsorbed by the adsorption material C within the canister 3, while the air passes through the adsorption material C and is dissipated into the atmosphere from the canister 3 through the atmospheric passage 10. Therefore, the internal pressure within the fuel tank 1 is released without causing atmospheric pollution, and any potential damage on the fuel tank 1 can be avoided.

During driving of the vehicle, the ECU 35 opens the purge passage valve 13, while the atmospheric passage valve 15 being kept to be opened and the branch passage valve 14 being kept to be closed. Therefore, a negative pressure produced by the intake air supplied into the engine is applied to the canister 3 via the purge passage 5. As a result, the fuel vapor adsorbed by the canister 3 is drawn to be desorbed and is thereafter purged into the intake air passage 31 via the purge passage 5. In addition, the atmospheric air is drawn from the atmospheric passage 10, so that the fuel vapor is promoted to be desorbed from the canister 3. In this state, because the branch passage valve 14 is closed, the fuel F discharged from the fuel pump 2 may not be introduced into the aspirator 8. As a result, it is possible to avoid such a situation that the amount of supply of fuel to the engine 30 becomes insufficient. Thus, because of the provision of the branch passage valve 14 in the branch passage 7, it is possible to introduce a part of the fuel F into the aspirator 8 when needed, while avoiding insufficient supply of the fuel to the engine 30. In addition, it is possible to shut off the branch passage 7 during measuring the fuel vapor pressure by the aspirator 8 when the amount of the fuel needed for the engine 30 is increased. When the engine 30 is stopped, the ECU 35 again closes the purge passage valve 13.

Figure 3:
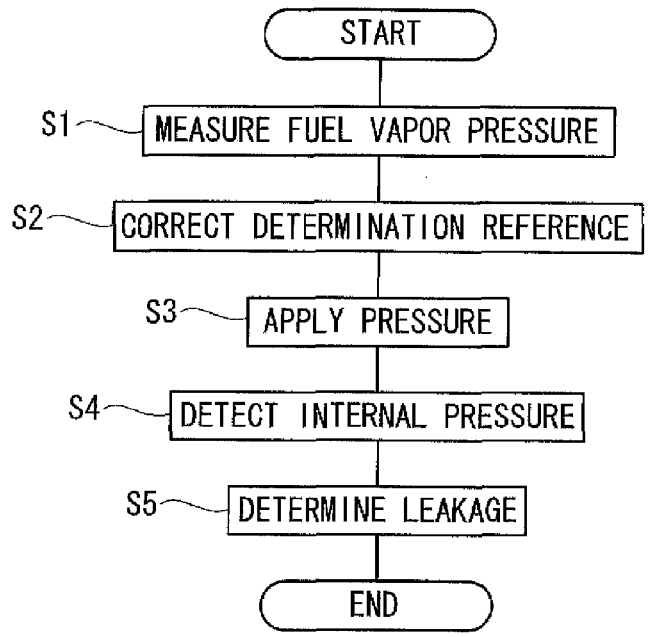
FIG. 3 is a flowchart of a diagnosis process performed by the leakage diagnosis device.
Figure 4:
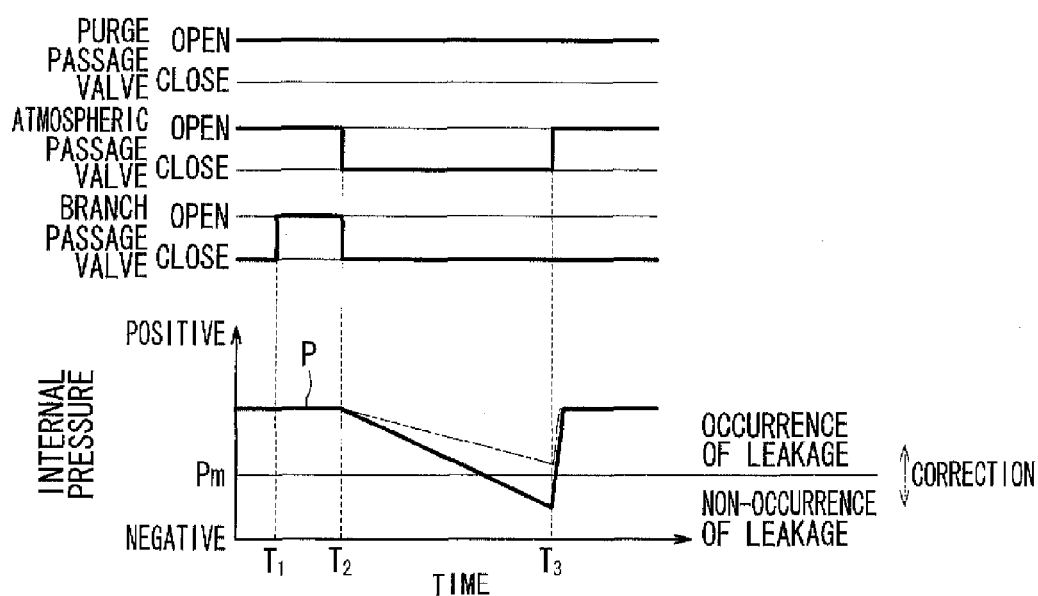
FIG. 4 shows timing charts of opening and closing timings of some of valves of the fuel vapor processing apparatus and a graph showing the change of an internal pressure of a process system of the apparatus according to the operations of the valves.

The process of the diagnosis of leakage from the fuel vapor processing apparatus incorporating the evaporation purge system will now be described with reference to FIGS. 3 and 4. FIG. 3 shows a flow chart of a leakage diagnosis process. FIG. 4 shows timing charts of opening and closing timings of various valves and a graph showing change of the internal pressure according to the opening and closing timings of the valves. The leakage diagnosis is performed by detecting the internal pressure of the process system by the pressure sensor 11 in the state that a pressure is applied to the process system, and by determining whether or not the result of detection satisfies a diagnosis criterion by the CPU 35. In the evaporation purge system of the first example, the leakage diagnosis is performed by applying a negative pressure to the process system, and the negative pressure is produced by the intake air supplied to the engine 30. Thus, in this evaporation purge system, the intake air passage that serves as the fuel vapor desorption device is used as a pressure applying device. Therefore, the leakage diagnosis is performed when the intake air negative pressure is available or during driving of the engine 30, preferably, during an idling operation of the engine 30.

On the condition described above, in this example, as shown in FIG. 3, the fuel vapor pressure is measured in a first step S1 prior to performing the leakage diagnosis, and thereafter, the diagnosis criterion (diagnosis reference pressure) is corrected based on the measured fuel vapor pressure in a second step S2. Subsequently, s pressure is applied to the process system in a third step S3, and the internal pressure of the process system is measured in a fourth step S4. Then, the process proceeds to a fifth step S5 in which the determination is made as to whether or not the internal pressure satisfies a predetermined diagnosis criterion. Although the steps of determining the fuel vapor pressure and correcting the diagnosis criterion (i.e., the first and second steps S1 and S2) may preferably be made immediately before the steps for the leakage diagnosis (i.e., the third to fifth steps S3 to S5), the determining and correcting steps may be made before a predetermined time before the leakage diagnosis steps. Thus, although the fuel vapor pressure determining step (or the diagnosis criterion correcting step) and the leakage diagnosis steps are preferably sequentially made, it is not always necessary. For example, the leakage diagnosis steps may not be performed sequentially with the fuel vapor pressure determining step (or the diagnosis criterion correcting step) depending on the driving condition of the vehicle. If the fuel vapor pressure determining step (or the diagnosis criterion correcting step) and the leakage diagnosis steps are sequentially made, it is possible to minimize the potential change of the fuel temperature after determining the fuel vapor pressure (or after correcting the diagnosis criterion) until performing the leakage diagnosis, so that accuracy of the leakage diagnosis can be improved.

Figure 13:
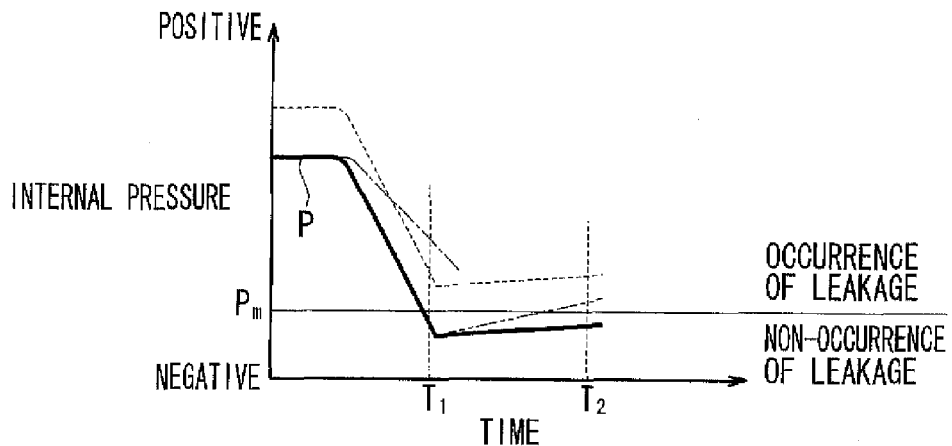
FIG. 13 is a graph showing change of an internal pressure of a process system when a negative pressure is applied for diagnosing leakage.
Figure 14:
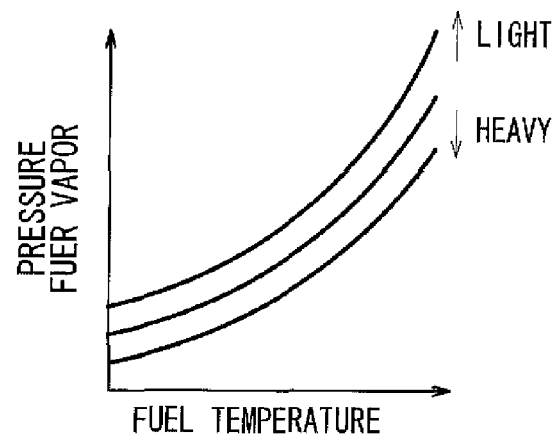
FIG. 14 is a graph showing the relationship between a fuel temperature and a fuel vapor pressure for different kinds of fuels.
Figure 15:
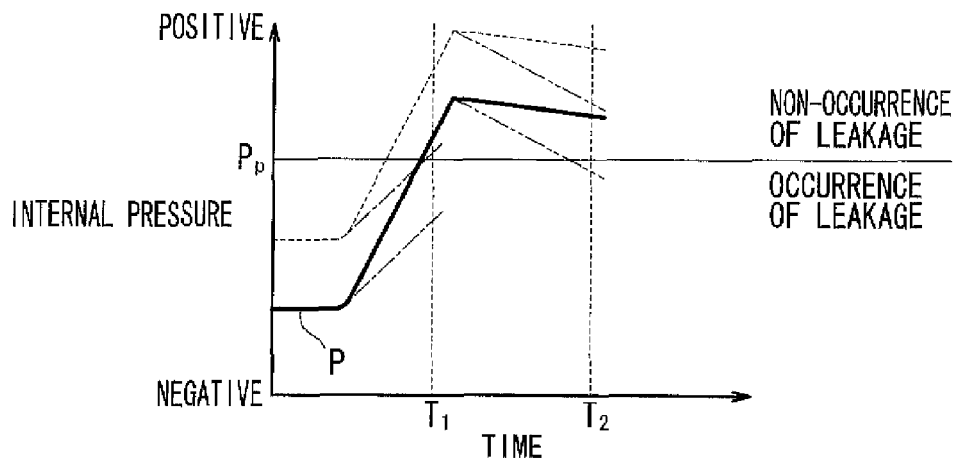
FIG. 15 is a graph showing change of an internal pressure of a process system when a positive pressure is applied for diagnosing leakage.

The process of determining the fuel vapor pressure will now be described. First, as shown in FIG. 4, the ECU 35 opens the branch passage valve 14 at timing T1. Then, a part of the fuel F discharged from the fuel pump 2 is introduced into the aspirator 8 via the fuel supply passage 6 and the branch passage 7. As a result, a negative pressure is produced at the aspirator 8, so that the pressure within the suction passage 9 becomes negative. The negative pressure within the suction passage 9 (or the aspirator 8) is detected by the negative pressure sensor 17, and the result of detection is inputted into the ECU 35. Here, as the aspirator 8 is operated, the atmospheric air is drawn into the fuel tank 1 via the suction passage 9. However, because the purge passage valve 13 and the atmospheric valve 15 are still opened even during the measurement of the fuel vapor pressure, the pressure within the fuel tank 1 is released due to the intake air negative pressure. The negative pressure that is detected by the negative pressure sensor 17 is a balanced pressure resulted from balancing between the fuel vapor pressure of the fuel F that is introduced into the aspirator 8 and decompressed and vaporized within the decompression chamber 43, and the negative pressure produced actually by the venturi effect. The data (or a map) showing the relationship between the fuel vapor pressure and the result of detection by the negative pressure sensor 17 is previously stored in the CPU 35. Therefore, the fuel vapor pressure can be calculated (identified) from the detected negative pressure within the suction passage 9 (or the aspirator 8). From this result, it is possible to determine whether the fuel F within the fuel tank 1 is in a state of being easy vaporized or in a state of being hard to be vaporized. Based on this determination, it is possible to correct a diagnosis criterion (diagnosis reference pressure) Pm that is previously stored in the ECU 35 for evaluation of the negative pressure. For example, if the measured fuel vapor pressure becomes higher, the internal pressure P within the process system including the fuel tank 1 becomes also higher (see dashed lines (broken lines) in FIGS. 13 and 15). Therefore, in such a case the diagnosis criterion (reference pressure) Pm is corrected to be increased.

Figure 5:
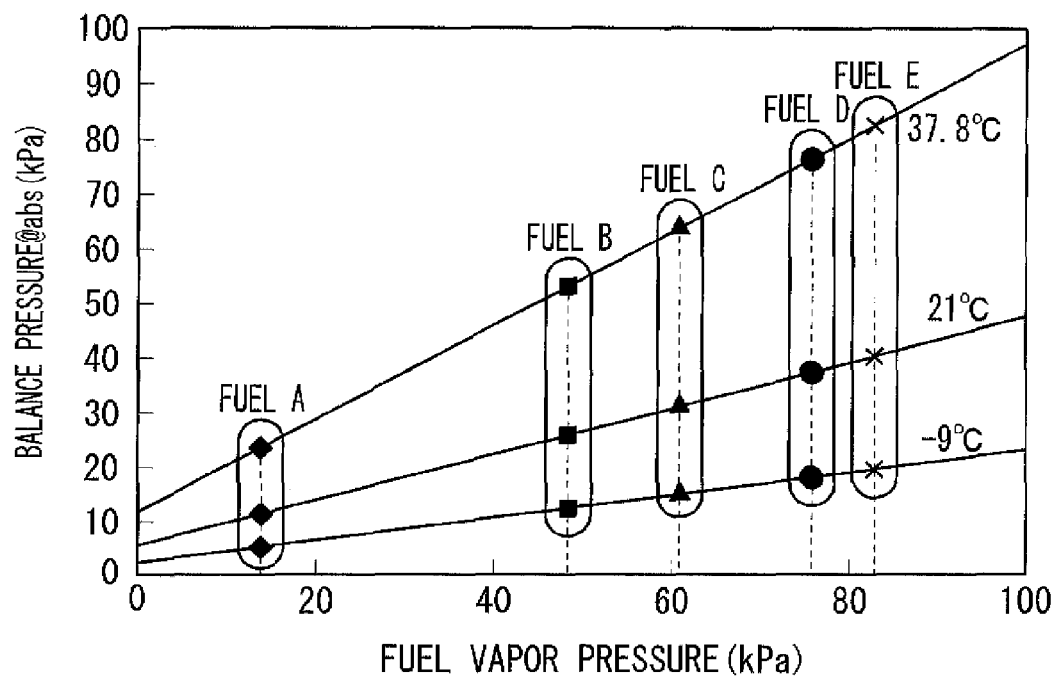
FIG. 5 is a graph showing the relationship between a fuel vapor pressure (physical value) and a balance pressure within the aspirator.
Figure 6:
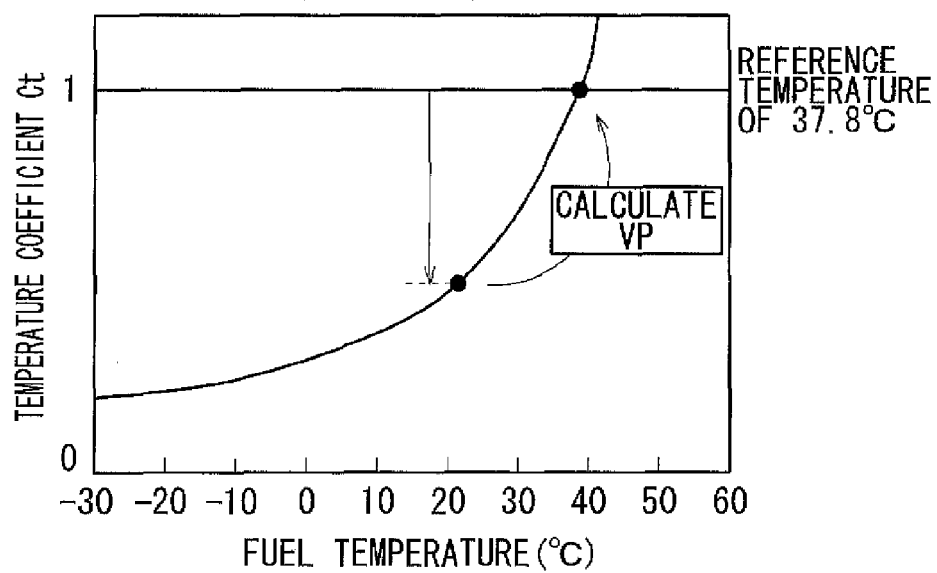
FIG. 6 is a graph showing the rate of change of the balance pressure when taken a balance pressure at 37.8° C. as a reference.

However, if the temperature of the fuel F introduced into the aspirator 8 is not stable, the fuel vapor pressure may not be accurately measured (identified) in some cases. Therefore, it may be preferable that the temperature of the fuel F is measured by the fuel temperature sensor 12 immediately before or after or at the same time the detection of the negative pressure within the suction passage 9 (or the aspirator 8). The result of detection by the fuel temperature sensor 12 is also inputted into the ECU 36. Based on the results of detection by the negative pressure sensor 17 and the fuel temperature sensor 12, the ECU 36 calculates the fuel vapor pressure as follows. FIG. 5 is a graph showing the relationship between the fuel vapor pressure (physical value) and the balance pressure within the aspirator 8. FIG. 6 is a graph showing a rate of change (temperature coefficient Ct) of the balance pressure with respect to the temperature when the balance pressure at 37.8° C. is taken as a reference. As will be seen from FIG. 5, the balance pressure correlates highly with the fuel vapor pressure irrespective of change of the kind of fuel at different temperatures. As shown in FIG. 6, irrespective of change of the kind of fuel, the ratio of change of the balance pressure varies at a given ratio with respect to change of temperature when the balance pressure at 37.8° C. is taken as a reference. Therefore, by detecting the balance pressure (P) within the aspirator 8 and the fuel temperature, it is possible to calculate an accurate fuel vapor pressure (VP) accommodating the change of temperature, according to the following expression:

$$VP=(/Ct)*\alpha*P+\beta$$

(Here, $\alpha$ denotes an inclination of a characteristic line of ratio of change of the balance pressure with respect to change of temperature when taking the reference temperature (37.8° C.) as a reference, and $\beta$ denotes an intercept of the characteristic line at zero pressure value of the balance pressure.)

After measurement of the fuel vapor pressure and the correction of the diagnosis criterion (reference pressure) Pm if needed, the branch passage valve 14 is closed and the atmospheric passage valve 15 is also closed at timing T2. However, the purge passage valve 13 is still kept to be open. Immediately after closing the branch passage valve 14, the pressure within the aspirator 8 and the pressure within the suction passage 9 are still kept to be negative. Therefore, it may be possible that the fuel F flows back from the aspirator 8 toward the suction passage 9 when the branch passage valve 14 is closed. However, no such backflow of the fuel F may occur in this example, because the check valve 16 is provided in the suction passage 9.

When the branch passage valve 14 and the atmospheric passage valve 15 are closed, the atmospheric air is prevented from flowing into the process system constituted continuously by within the fuel tank 1, the vapor passage 4, the canister 3, a part of the atmospheric passage 10 on the downstream side of the atmospheric passage valve 15, and the purge passage 5. Therefore, the internal pressure P within the process system becomes negative by the intake air negative pressure. Thereafter, at timing T3, the pressure sensor 11 detects the internal pressure P, and the result of detection is inputted into the ECU 35. The timing T3 may be after a predetermined time from closing the atmospheric passage valve 15. If no leakage occurs, the atmospheric air cannot enter the fuel vapor processing apparatus, and the internal pressure P becomes lower than the diagnostic criterion (reference pressure) Pm as indicated by a solid line in the graph of FIG. 4. Therefore, the ECU 35 determines that no leakage occurs if the result of detection (the internal pressure P) is less than the diagnostic criterion or the reference pressure Pm. On the other hand, if leakage occurs from the fuel vapor processing apparatus, the atmospheric air may enter the apparatus from a leakage portion of the apparatus. Therefore, the internal pressure P of the process system may not become lower than the reference pressure Pm as indicated by one-dot chain line in FIG. 4. Hence, the ECU 35 determines that leakage occurs if the result of detection of the internal pressure P is equal to or more than the reference pressure Pm. The internal pressure P of the process system at the timing T3 can be obtained by always monitoring the internal pressure P by the pressure sensor 11 or by detecting the internal pressure P by the pressure sensor 11 only at the timing T3.

SECOND EXAMPLE

In the above first example, leakage from the process system is diagnosed based on the rate of decrease of pressure within the process system. However, it may be possible to diagnosis the leakage based on the rate of increase of pressure within the process system in the state that the process system is kept at a negative pressure. In such a case, the purge passage valve 13 is closed at timing T2 when the pressure within the process system becomes negative to a certain level after the atmospheric passage valve 15 is closed at timing T1. Therefore, the space within the process system is closed so as to be kept at a negative pressure. Basically, the timing for closing the purge passage valve 13 may be after a predetermined time from closing the atmospheric passage valve 15. Otherwise, this timing may be set at a time when the internal pressure P becomes less than a reference pressure that is set to be lower than the diagnosis criterion (reference pressure) Pm applied to the diagnosis using the negative pressure.

Figure 7:
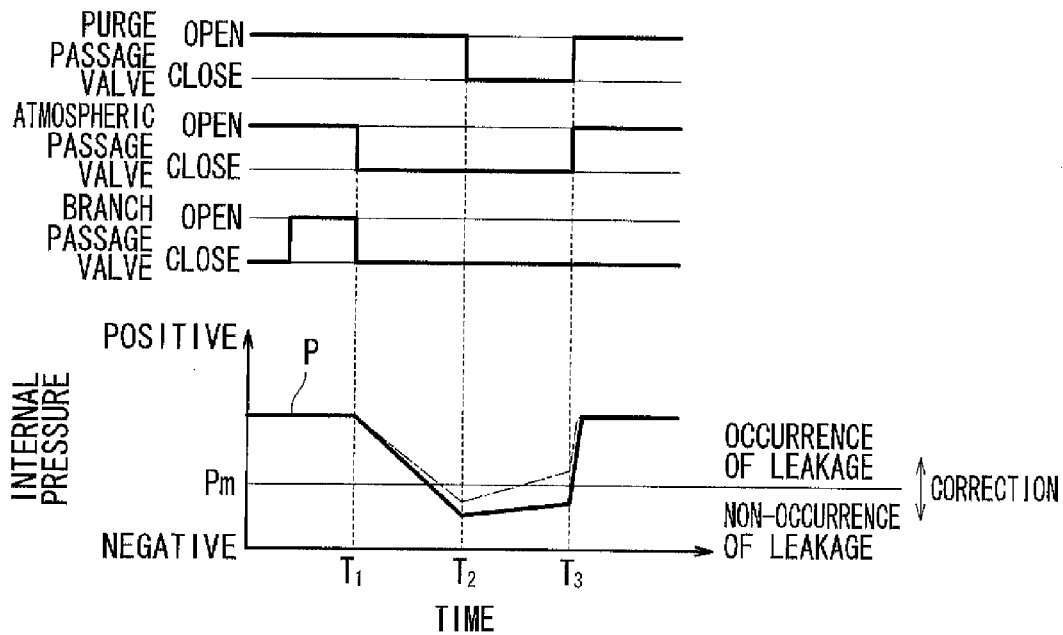
FIG. 7 shows timing charts of opening and closing timings of some of valves of a fuel vapor processing apparatus incorporating a leakage diagnosis device according to a second example and a graph showing the change of an internal pressure of a process system of the apparatus according to the operations of the valves.

Even after the process system has been closed, the fuel F that exists within the fuel tank 1, etc., may still be vaporized. Therefore, the internal pressure P within the process system may gradually increase during keeping the process system at the negative pressure. However, if no leakage occurs from the fuel vapor processing apparatus, the rate of increase of pressure during keeping the negative pressure may be small, as indicated by a solid line in FIG. 7. Therefore, the ECU 35 determines that no leakage occurs if the result of detection of the internal, pressure P by the pressure sensor 11 is less than the diagnosis criterion (reference pressure) Pm. If leakage occurs from the fuel vapor processing apparatus, the atmospheric air may enter the apparatus from a leakage portion, and therefore, the internal pressure P during keeping at the negative pressure may rapidly increase as indicated by a one-dot chain line in FIG. 7. Therefore, the ECU 35 determines that leakage occurs if the result of detection of the internal pressure P by the pressure sensor 11 is equal to or more than the diagnosis criterion (reference pressure) Pm. In other respect, the construction of the fuel vapor processing apparatus, the construction of the leakage diagnosis device and the method of correcting the diagnosis criterion (reference pressure) may be the same as the first example.

THIRD EXAMPLE

Figure 8:
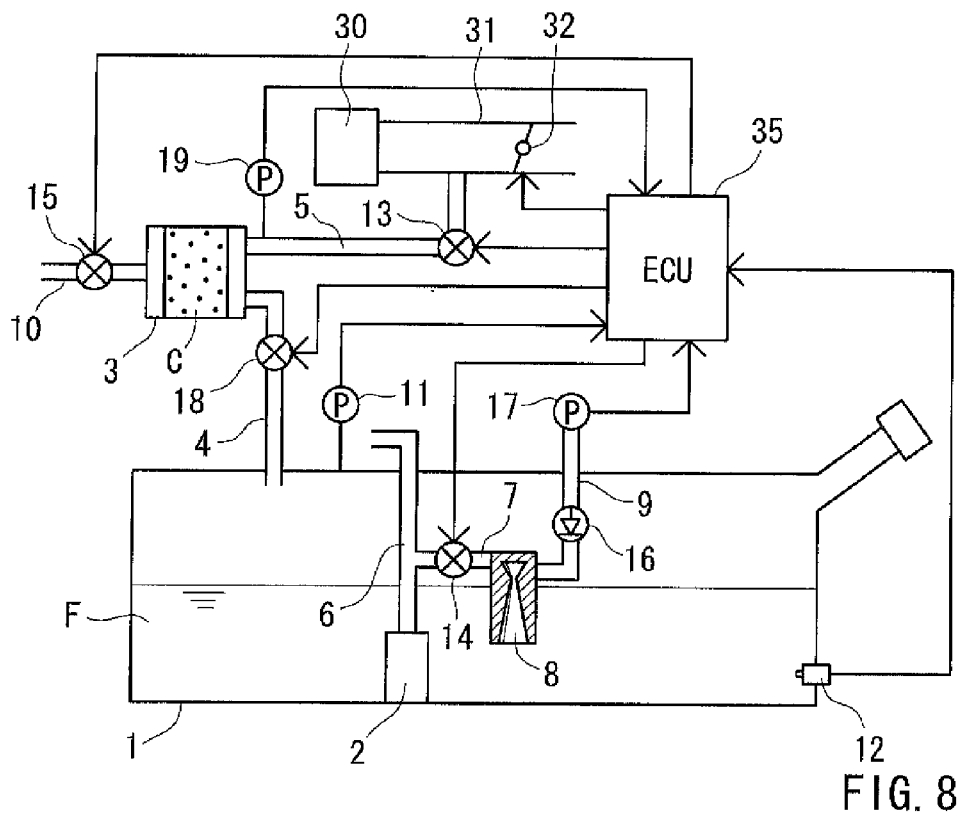
FIG. 8 is a schematic view showing a fuel vapor processing apparatus and a leakage diagnosis device incorporated thereinto according a third example.

Although the aspirator 8 is used only as a device for determining the fuel vapor pressure in the first and second examples, the aspirator 8 can be used also as a pressure applying device in conjunction with the intake air passage 31 according to a third example. In this example, as shown in FIG. 8, a vapor passage valve 18 is provided in the vapor passage 4 of the fuel vapor processing apparatus in addition to the arrangement of the first example. The vapor passage valve 18 is a device for switching between the communicating state and the shut-off state of the vapor passage 4 and may be a solenoid valve. The ECU 35 controls the opening and closing timings of the vapor passage valve 18. In addition, in the case of the third example, when the leakage diagnosis is made, the ECU 35 closes the vapor passage valve 18 in addition to opening the branch passage valve 14. Therefore, the inside of the process system is divided into a first region and a second region. The first region is defined by the purge passage 5, the canister 3, the atmospheric passage 10, and a part of the vapor passage 4 on the downstream side of the vapor passage valve 18. The second region is defined by a space extending from within the fuel tank 1 to the vapor passage valve 18 in the vapor passage 4. According to the third example, the leakage diagnosis is performed by setting the first region including the canister 3 at a negative pressure and by setting the second region including the fuel tank 1 at a positive pressure. In this connection, a pressure sensor 19 for detecting the pressure within the first region including the canister 3 is also provided in addition to the construction of the first example. The pressure sensor 19 may be provided at any position as long as it can detect the internal pressure within the first region. For example, the pressure sensor 19 may be provided at a part of the purge passage 5 on the upstream side (the side of the canister 3) of the purge passage valve 13, the canister 3, a part of the atmospheric passage 10 on the upstream side (the side of the canister) of the atmospheric passage valve 15 or a part of the vapor passage 4 on the downstream side (the side of the canister 3) of the vapor passage valve 18. The ECU 35 is set with a diagnosis criterion (reference pressure) Pm for diagnosing leakage from the first region by using a negative pressure and a diagnosis criterion Pp for diagnosing leakage from the second region by using a positive pressure. Therefore, the ECU 35 is configured to be able to correct both of the diagnosis criteria (reference pressures) Pm and Pp based on the measured fuel vapor pressure.

Figure 9:
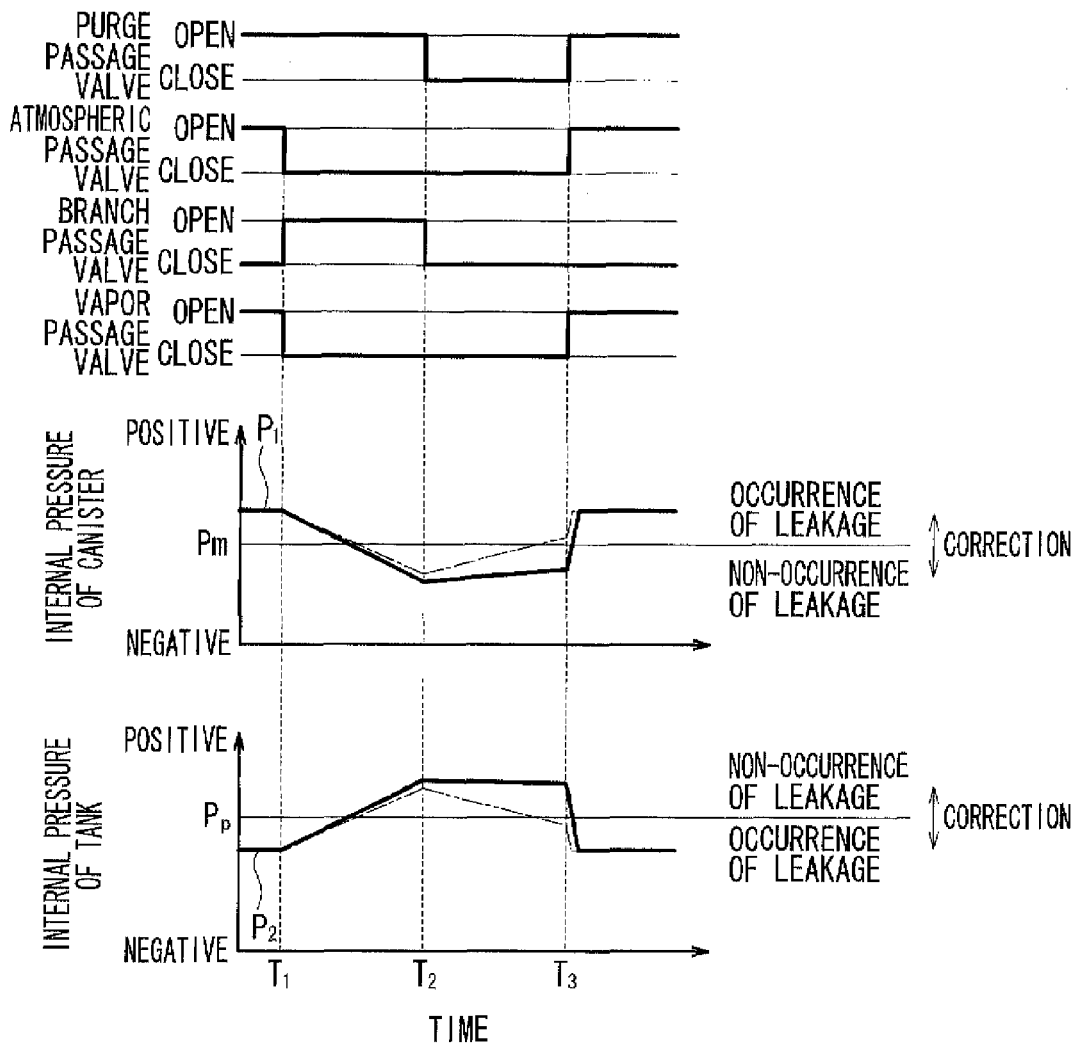
FIG. 9 shows timing charts of opening and closing timings of some of valves of a fuel vapor processing apparatus of the third example and graphs showing changes of internal pressures at different parts of the apparatus according to the operations of the valves.

The leakage diagnosis performed in the third example will now be described. FIG. 9 shows timing charts of opening and closing timings of various valves and a graph showing change of the internal pressure of the process system according to the third example. In order to diagnose the leakage from the fuel vapor processing apparatus, the atmospheric passage valve 15 is closed, the branch passage valve 14 is opened, and the vapor passage valve 18 is closed at timing T1. Then, the intake air negative pressure is applied to the first region including the canister 3, so that the first region has an internal pressure P1. On the other hand, as the fuel F is introduced into the aspirator 8 from the fuel pump 2, the atmospheric air is drawn into the second region including the fuel tank 1 to apply a positive pressure to the second region, so that the second region. has an internal pressure P2. At the same time, it is possible to measure the fuel vapor pressure by using the aspirator 8. The fuel vapor pressure can be measured in the same manner as described in the first example. In this way, it is possible to use the aspirator 8 as a device for determining the fuel vapor pressure and also as a pressure applying device. Thus, in the third example, the intake air passage 31 and the aspirator 8 are used as pressure applying devices. Because the process system can be divided into two regions, each of the regions to which pressures are applied by the intake air and the aspirator 8, respectively, becomes narrower than the total volume of the two regions, and therefore, it is possible to achieve the desired pressure condition of the entire process system faster than in the first example in which the pressure is applied to the entire process system by only the intake air. After the diagnosis criteria (reference pressures) Pm and Pp are corrected based on the measured fuel vapor pressure, the purge passage valve 13 and the branch passage valve 14 are closed at timing T2. Therefore, each of the first region and the second region is closed or sealed, so that the first region is kept at the negative pressure while the second region is kept at the positive pressure. In this state, the internal pressure P1 of the first region is detected by the pressure sensor 19 at diagnosis timing T3 to make diagnosis of leakage in the same manner as the second example. On the other hand, although the second region is kept at the positive pressure, gas within the second region may flow to the outside if leakage occurs from the fuel vapor processing apparatus. Therefore, as indicated by two-dot chain line in FIG. 9, the internal pressure P2 within the second region may decrease even during keeping at the positive pressure. Hence, the CPU 35 determines that no leakage occurs if the internal pressure P2 of the second region detected by the pressure sensor 11 at diagnosis timing T3 is more than the diagnosis criterion (reference pressure) Pp. On the other hand, if the internal pressure P2 of the second region at diagnosis timing T3 is equal to or less than the diagnosis criterion (reference pressure) Pp, the CPU 35 determines that leakage occurs. The other operations are the same as the first example.

FOURTH EXAMPLE

A four example will now be described. The fourth example is a modification of the third example. The measurement of the fuel vapor pressure and the correction of the diagnosis criterion based on the measured fuel vapor pressure are not necessary to be performed during application of the pressure to the second region by the aspirator 8. Thus, the measurement of the fuel vapor pressure and the correction of the diagnosis criterion can be made before application of the positive pressure to the second region for diagnosing the leakage. It is also possible that the timing of diagnosing the leakage from the first region and the timing of diagnosing the leakage from the second region are different from each other. For example, if the diagnosis criterion (reference pressure) Pm for diagnosing leakage by applying the negative pressure has been corrected previously, it is not necessary for diagnosing the leakage based on the rate of increase of pressure during keeping the first region at the negative pressure (timing T2 to timing T3), and therefore, it is possible to diagnose leakage based on the rate of decrease of pressure during application of the negative pressure as in the case of the first example (between timing T1 and timing T2). Also, for the second region, if the diagnosis criterion (reference pressure) Pp for diagnosing leakage by applying the positive pressure has been corrected previously, it is possible to diagnose leakage based on the rate of increase of pressure during application of the positive pressure (between timing T1 and timing T2). Further, it is possible to perform the leakage diagnosis by applying the positive pressure without providing the vapor passage valve 18 and the pressure sensor 19. Thus, it is possible to achieve the positive pressure within the entire process system by opening the purge passage valve 13 at timing T1. In such a case, it is necessary to set the ECU 35 with only the diagnosis criterion (reference pressure) Pp for diagnosing leakage by applying a positive pressure.

FIFTH EXAMPLE

Figure 10:
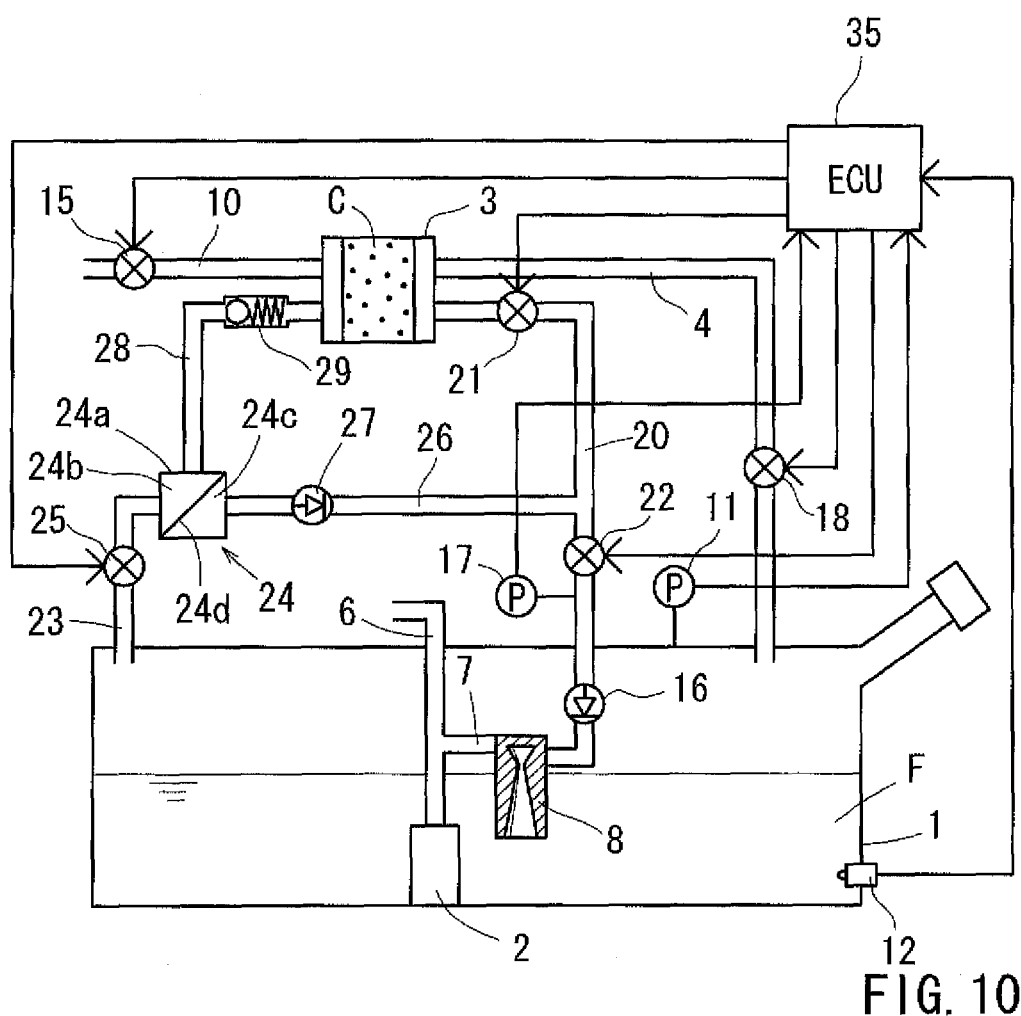
FIG. 10 is a schematic view showing a fuel vapor processing apparatus and a leakage diagnosis device incorporated thereinto according a fifth example.

A fifth example will now be described. In this example, a leakage diagnosis device is used in conjunction with a fuel vapor processing apparatus incorporating a purge-less evaporation system that does not utilize the intake air. FIG. 10 shows a schematic construction of the fuel vapor processing apparatus including the leakage diagnosis device of the fifth example. In FIG. 10, components or parts that are similar to those of the first to fourth examples are labeled with the same reference signs as the first to fourth examples, and the detailed description of these components or parts will be omitted. Referring to FIG. 10, the fuel vapor processing apparatus includes the fuel tank 1 for storing the fuel F, the fuel pump 2 pressurizing and feeding the fuel F to the internal combustion engine (not shown in FIG. 10), the canister 3 capable of adsorbing fuel vapor produced within the fuel tank 1, the vapor passage 4 for introducing fuel vapor produced in the fuel tank 1 to the canister 3, the fuel supply passage 6 through which fuel F discharged from the fuel pump 2 is fed under pressure, the branch passage 7 branched off from the fuel supply passage 6, the aspirator 8 connected to the branch passage 7, the atmospheric passage 10 communicating between the canister 3 and the atmosphere, the pressure sensor 11 (or the pressure detecting device) provided at the fuel tank 1, the fuel temperature sensor 12 (or the fuel temperature detecting device) for detecting the temperature of the fuel F, the atmospheric passage valve 15 provided in the atmospheric passage 10, the vapor passage valve 18 provided in the vapor passage 4, and the ECU 35 for performing various controls and computing processes, etc. The adsorption material C is filled within the canister 3 and may be activated carbon or any other suitable material that allows passage of air but can absorb the fuel vapor. The results of detection by the pressure sensor 11, and the fuel temperature sensor 12 are inputted into the ECU 35. The fuel temperature sensor 12 may be provided at the fuel supply passage 6, the branch passage 7 or the aspirator 8. The atmospheric passage valve 15 and the vapor passage valve 18 may be solenoid valves, the opening and closing timings of which are controlled by the ECU 35. Similar to the first to fourth examples, a device for determining the fuel vapor pressure is constituted by the aspirator 8, the negative pressure sensor 17 and the ECU 35 in this example.

An explanation focused to different points from the first to fourth examples will now be made. In this example, the suction passage 9 connected to the decompression chamber 43 of the aspirator 8 (see FIG. 2) is connected to the canister 3 to form a recovery passage 20. Thus, the decompression chamber 43 of the aspirator 8 communicates with the canister 3 via the recovery passage 20. A first recovery passage valve 21 and a second recovery passage valve 22 are provided in the recover passage 20 and serve as an opening and closing device for switching between the communicating state and the shut-off state of the recovery passage 20. The first recovery passage valve 22 is disposed on the upstream side of the second recovery passage valve 22. The first and second recovery passage valves 21 and 22 may be solenoid valves, the opening and closing timings of which are controlled by the ECU 35. The negative pressure sensor 17 (or the negative pressure detecting device) for detecting the negative pressure produced by the aspirator 8 is disposed at a part of the recovery passage 20 on the downstream side (or the side of the aspirator 8) of the second recovery passage valve 22. Also, the detection signal of the negative pressure sensor 17 is inputted into the ECU 35. Further, the check valve 16 is provided at a downstream side portion (proximal to the aspirator 8) of the recovery passage 20.

A first communication passage 23 is connected to the fuel tank 1, so that gas contained within the fuel tank 1 and including fuel vapor newly produced during recovery of the fuel vapor is introduced into the first communication passage 23. A separation membrane module 24 for preferentially separating a specific component by allowing passage of the specific component is connected to a downstream end of the first communication passage 23. The separation membrane module 24 includes a sealed container 24a and a separation membrane 24d that is disposed within the sealed container 24a for dividing the inner space of the sealed container 24a into an introduction chamber 24b and a permeation chamber 24c. For the separation membrane 24d, a membrane having a high dissolution/diffusion coefficient for the fuel component and capable of preferentially permit permeation of the fuel component but inhibiting permeation of air component is used. Thus, the specific component separated by the separation membrane module 24 is the fuel component in this example. The fuel tank 1 communicates with the introduction chamber 24b via the first communication passage 23. A first communication passage valve 25 is provided in the first communication passage 23 as an opening and closing device for switching between the communicating state and the shut-off state of the first communication passage 23. The first communication passage valve 25 may be a solenoid valve, which opening and closing timings are controlled by the ECU 35. The permeation chamber 24c of the separation membrane module 24 communicates with the recovery passage 20 via a second communication passage 26. More specifically, the second communication passage 26 is connected to the recovery passage 20 at a position between the first recovery passage valve 21 and the second recovery passage valve 22. A check valve 27 is provided in the second communication passage 26 for preventing backflow from the side of the aspirator 8 toward the separation membrane module 24. The introduction chamber 24b of the separation membrane module 24 communicates with the canister 3 via a third communication passage 28. A pressure control valve 29 is provided in the third communication passage 28. The pressure control valve 29 serves as a check valve that permits only the flow of gas from the separation membrane module 24 to the canister 3 when a predetermined pressure is applied.

The fuel vapor processing apparatus of the fifth example does not directly communicate with the intake air passage (not shown). Therefore, a passage corresponding to the purge passage 5 of the first to fourth examples is not provided. In addition, a fuel introduction control device for switching between an introduction state and a shut-off state for the flow of the fuel into the aspirator 8 is not provided in the branch passage 7. However, it may be preferable that a fuel introduction amount control device or a valve is provided for controlling (increasing or decreasing) the amount of introduction of the fuel into the aspirator 8. This enables to control (increase or decrease) the fuel introduction amount into the aspirator 8 in response to the amount of the fuel needed by the engine, and therefore, it is possible to avoid short of supply of the fuel to the engine. In addition, it is possible to control the maximum pressure applied to the process system during the leakage diagnosis. The fuel introduction amount control device may be provided in the branch passage 7 or may be provided at the aspirator 8. In the fifth example, all the elements shown in FIG. 10 except for the fuel pump 2, the fuel supply passage 6 and the branch passage 7 may constitute the process system. In the fifth example having the process system constituted in this way, the process system is separated into a positive pressure region and a negative pressure region. The positive pressure region is defined by a space extending from within the fuel tank 1 to the vapor passage valve 18 in the vapor passage 4 and a space extending from within the fuel tank 1 to the first communication passage valve 25 in the first communication passage 23. The negative pressure region is defined by the other spaces including the canister 3. The details of the positive and negative regions will be explained later.

A mechanism for processing the fuel vapor in the fuel vapor processing apparatus in the fifth example will now be described. The atmospheric passage valve 15, the vapor passage valve 18 and the second recovery passage valve 22 are normally closed. When the internal pressure within the fuel tank 1 is increased due to production of fuel vapor in the state where the fuel pump 2 is not driven during parking of the vehicle (i.e., when the engine is not driven) or during filling of fuel into the vehicle, gas (air and fuel vapor) contained within the fuel tank 1 may flow into the canister 3 via the vapor passage 4. Then, the fuel vapor is selectively adsorbed by the adsorption material C disposed within the canister 3, while the air passes through the adsorption material C and is dissipated from the canister 3 into the atmosphere via the atmospheric passage 10.

During driving of the fuel pump 2 as in the case of during driving of the vehicle, the atmospheric passage valve 15 and the vapor passage valve 18 are closed, while the first recovery passage valve 21 is opened. Therefore, a part of the fuel F discharged from the fuel pump 2 is introduced into the aspirator 8 via the fuel supply passage 6 and the branch passage 7, so that a negative pressure is produced at the aspirator 8. Hence, the fuel vapor adsorbed by the canister 3 is drawn to be desorbed and is thereafter recovered into the fuel tank 1 via the recovery passage 20 through the aspirator 8. At this time, the pressure inside of the canister 3 is negative because the vapor passage valve 18 is closed and because of the presence of the pressure control valve 29. In this way, the fuel vapor processing apparatus of the fifth example is configured as a purge-less evaporation system in which the fuel vapor is recovered into the fuel tank 1 by the operation of the aspirator 8. In other words, in the fifth example, the aspirator 8 serves as the fuel vapor pressure determining device and also serves as a fuel vapor desorbing device.

During the recovery of the fuel vapor, the first communication passage valve 25 is opened. Therefore, gas within the fuel tank 1 including fuel vapor newly produced within the fuel tank 1 during recovering the fuel vapor is introduced into the introduction chamber 24b of the separation membrane module 24 via the first communication passage 23. Then, the fuel component contained in the gas preferentially permeates the separation membrane 24d to pass therethrough from the introduction chamber 24b into the permeation chamber 24c. Therefore, the gas is separated into the fuel vapor (condensed gas) on the side of the permeation chamber 24c and the air component (diluted gas) remaining on the side of the introduction chamber 24b. The fuel vapor (condensed gas) separated by the separation membrane 24d is recovered into the fuel tank 1 via the second communication passage 26, the recovery passage 20 and the aspirator 8. On the other hand, the air component (diluted gas) remaining within the introduction chamber 24b is introduced into the canister 3 via the third communication passage 28 so as to be used for desorbing the fuel vapor from the canister 3. Although a negative pressure is applied to the introduction chamber 24c through the aspirator 8, the introduction chamber 24b has a positive pressure by the operation of the pressure control valve 29. In this way, a pressure difference is produced between the introduction chamber 24b and the permeation chamber 24c that are separated by the separation membrane 24d from each other, so that it is possible to effectively separate the fuel vapor.

When the fuel pump 2 is stopped, the atmospheric passage valve 15 and the vapor passage 18 is opened again while the first recovery passage valve 21 and the first communication passage valve 25 are closed again. The check valve 16 may prevent backflow of the fuel F from the aspirator 8 immediately after stopping the fuel pump 2. During recovery of the fuel vapor, the second recover passage valve 22 is not operated (kept to be opened).

The leakage diagnosis process for the fuel vapor processing apparatus of the fifth example will now be described. Also in the fifth example, it is possible to perform the leakage diagnosis during driving of the engine (during running of the vehicle) in the same manner as the first to fourth examples. However, because the intake air negative pressure is not utilized in the fifth example, it may be preferable that the leakage diagnosis is made during parking of the vehicle or when the engine is stopped. This is, because the engine or the fuel pump 2 is not driven, the temperature of the fuel F may not increase and may be kept in stable at a relatively low temperature value. For this reason, the description of the leakage diagnosis will be explained on the assumption that the diagnosis is performed when the vehicle is parking or stopped. To this end, the ECU 35 may control to start the leakage diagnosis after a predetermined time (for example, 3 to 12 hours) from stopping the engine.

The leakage diagnosis process of the fifth example is performed according to process steps that are basically the same as those of the first to fourth examples. Thus, as shown in FIG. 3, the fuel vapor pressure is measured in the first step S1 prior to performing the leakage diagnosis, and thereafter, the diagnosis criterion (diagnosis reference pressure) is corrected based on the measured fuel vapor pressure in the second step S2. Subsequently, a pressure is applied to the process system in the third step S3, and the internal pressure of the process system is measured in the fourth step S4. Then, the process proceeds to the fifth step S5 in which the determination is made as to whether or not the internal pressure satisfies a predetermined diagnosis criterion. Although the steps of determining the fuel vapor pressure and correcting the diagnosis criterion (i.e., the first and second steps S1 and S2) may preferably be made immediately before the steps for the leakage diagnosis (i.e., the third to fifth steps S3 to S5), the determining and correcting steps may be made at a given time before the leakage diagnosis steps. If the fuel vapor pressure determining step and the leakage diagnosis steps are made as sequential steps, it may be advantageous in that it is possible to minimize the potential change of the fuel temperature between the time when determining the fuel vapor pressure and the time when making the leakage diagnosis. On the other hand, if the fuel vapor pressure is measured at a given time before the steps for the leakage diagnosis, it is possible to minimize the time required before making the leakage diagnosis. This is particularly advantageous in the case that the leakage diagnosis is made during parking of the vehicle. Thus, in the case of the purge-less evaporation system, basically, the aspirator 8 operates even during running of the vehicle, and therefore, it may be efficient if the fuel vapor pressure is measured during running of the vehicle.

Figure 11:
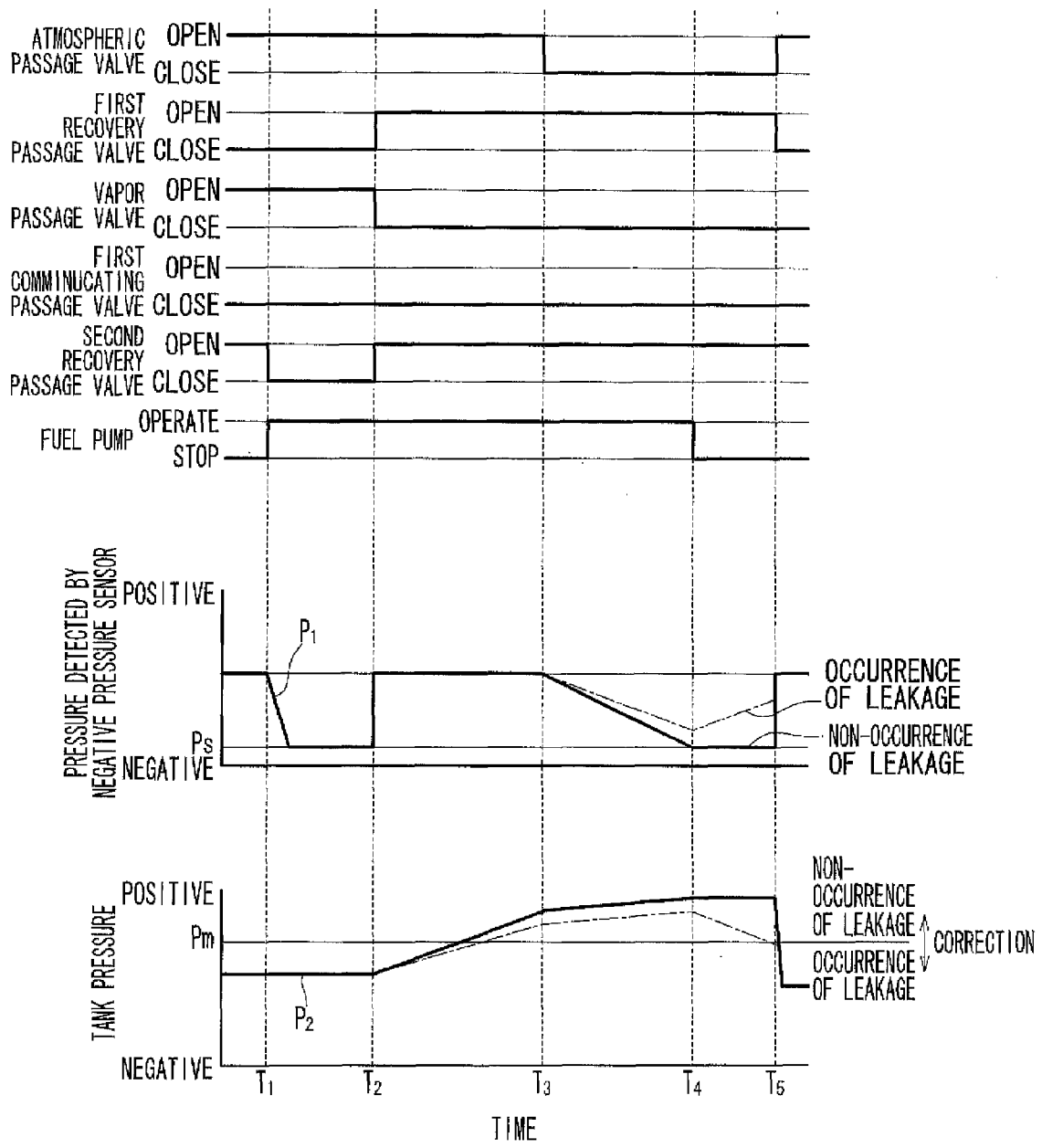
FIG. 11 shows timing charts of opening and closing timings of some of valves of the fuel vapor processing apparatus of the fifth example and graphs showing changes of internal pressures at different parts of the apparatus according to the operations of the valves.

FIG. 11 shows timing charts of opening and closing various valves and graphs showing changes of pressures in the process system according to the operations of the valves. The timing charts of FIG. 11 are prepared on the assumption that the measurement of the fuel vapor pressure and the leakage diagnosis are performed sequentially during parking of the vehicle. As described previously, the atmospheric valve 15, the vapor passage valve 18 and the second recovery passage 22 are opened during parking of the vehicle. On the other hand, the first recovery passage vale 21 and the first communication passage valve 25 are closed. At a predetermined time after the engine has stopped, the fuel vapor pressure is measured and the diagnosis criterion (reference pressure) is corrected if necessary, before making the leakage diagnosis. More specifically, the fuel pump 2 is driven at timing T1, so that the fuel F is introduced into the aspirator 8 via the branch passage 7 to produce a negative pressure within the decompression chamber 43 (see FIG. 2). At the same time that the fuel pump 2 is driven at timing T1, the second recovery passage valve 22 is closed. Then, a par of the recovery passage 20 between the aspirator 8 and the second recovery passage valve 20 becomes to be a closed space and to have a negative pressure as indicated by a solid line in one of the graphs (upper one) shown in FIG. 11. The negative pressure sensor 17 detects the pressure (internal pressure P1) within this closed space. In addition, the fuel temperature sensor 12 detects the temperature of the fuel F. After that, the fuel vapor pressure is measured or calculated by the ECU 35 in the same manner as the first to fourth examples. Based on the measured fuel vapor pressure, the diagnosis criterion (reference pressure) Pp for the diagnosis by applying a positive pressure is corrected. For example, if the fuel vapor pressure is high, the diagnosis criterion (reference pressure) Pp is corrected to be increased.

The gas within a part of the recovery passage 20 on the downstream side of the second recovery passage valve 22 is introduced into the fuel tank 1 by the aspirator 8. However, during determining the fuel vapor pressure, the atmospheric passage valve 15 and the vapor passage valve 18 are opened. Therefore, during determining the fuel vapor pressure, the pressure within the fuel tank 1 is released via the vapor passage 4, the canister 3 and he atmospheric passage 10 in this order. Further, although the fuel pump 2 is operated, the engine is not driven. Therefore, during determining the fuel vapor pressure and when the leakage diagnosis is made, surplus fuel other the fuel that is introduced into the aspirator 8 via the fuel pump 2 is released into the fuel tank 1 via a pressure regulator (not shown). In the case of the fifth example, the diagnosis criterion (reference pressure) Pm for the diagnosis by applying a negative pressure as in the cases of the first to fourth examples is not used. Alternatively, a saturation pressure (saturation negative pressure) Ps during measurement of the fuel vapor pressure is stored in the CPU 35 and is used as a diagnosis criterion for a leakage diagnosis performed by apply a negative pressure.

Next, the first and second recovery passage valves 21 and 22 are opened while the vapor passage valve 18 is closed at timing T2. Therefore, the process system is divided into a first region including the canister 3 and a second region including the fuel tank 1 by the vapor passage valve 18 and the first communication passage valve 25. More specifically, in this fourth example, the first region is defined by a space within the canister 3, a part of the vapor passage 4 extending from the canister 3 to the vapor passage valve 18, the recovery passage 20, the aspirator 8, the atmospheric pressure passage 10, a part of the first communication passage 23 extending from the separation membrane module 24 to the first communication passage valve 25, the separation membrane module 24, the second communication passage 26, and the third communication passage 28. The second region is defined by a space defined by the fuel tank 1, a part of the vapor passage 4 extending from the fuel tank 1 to the vapor passage valve 18, and a part of the first communication passage 23 extending from the fuel tank 1 to the first communication passage valve 25.

Due to the negative pressure produced by the aspirator 8, the atmospheric air is introduced into the fuel tank 1 via the atmospheric passage 10, the canister 3 and the recovery passage 20 in this order. Therefore, a positive pressure is applied to the second region including the fuel tank 1 as indicated by a solid line (indicating internal pressure P2) in the other of the graphs (lower one) shown in FIG. 11. On the other hand, at this moment, the internal pressure P1 of the first region including the canister 3 is substantially equal to the atmospheric pressure. After the positive pressure has been applied throughout the second region including the fuel tank 1, the atmospheric passage valve 15 is closed at timing T3. Therefore, the first region including the canister 3 becomes a closed space. Then, due to incorporation of the gas within the first region into the fuel tank 1 via the aspirator 8, a negative pressure is applied to the first region. After the negative pressure has been applied throughout the first region, the fuel pump 2 is stopped at timing T4, so that the first region is kept at the negative pressure while the second region is kept at the positive pressure. In this way, in the fifth example, the aspirator 8 is used also as a pressure applying device in addition to the use as the fuel vapor pressure determining device and the fuel vapor desorbing device.

At timing T5, the internal pressure P1 of the first region is detected by the negative pressure sensor 17 and the internal pressure P2 of the second region is detected by the positive pressure sensor 11 for the leakage diagnosis. More specifically, if no leakage occurs from the first region, as indicated by the solid line in the upper graph shown in FIG. 11, the internal pressure P1 of the first region has a negative value that is substantially equal to the saturation negative pressure Ps stored when determining the fuel vapor pressure. Therefore, if the internal pressure P1 at timing T5 (diagnosis timing) during keeping the negative pressure of the first region is substantially equal to the saturation negative pressure Ps, it may be determined that no leakage occurs. On the other hand, if leakage occurs from the first region, the internal pressure P1 becomes higher than the saturation negative pressure Ps as indicated by a one-dot chain line in the upper graph shown in FIG. 11 due to flow of the atmospheric air into the first region. Therefore, if the internal pressure P1 or the result of detection of the pressure by the negative pressure sensor 17 at timing T5 for making the diagnosis is higher than the saturation negative pressure Ps, it may be determined that leakage occurs. In the case that the leakage diagnosis is made by using the saturation negative pressure Ps when determining the fuel vapor pressure, it is not necessary to correct the diagnosis criterion, so that the diagnosis can be easily made.

As for the second region, if the internal pressure P2 or the result of detection by the pressure sensor 11 at timing T5 (diagnosis timing) is higher than the diagnosis criterion (reference pressure) Pp, it may be determined that no leakage occurs. If leakage occurs, the internal pressure P2 in the second region may be lowered as indicated by a two-dot chain line in the lower graph shown in FIG. 11. Therefore, it may be determined that leakage occurs if the internal pressure P2 or the result of detection by the pressure sensor 11 at timing T5 (diagnosis timing) is equal to or less than the diagnosis criteria (reference pressure) Pp. After the leakage diagnosis for the first and second regions has been made, the process system returns to the state for the normal parking condition (the state when starting the control of FIG. 11).

SIXTH EXAMPLE

Figure 12:
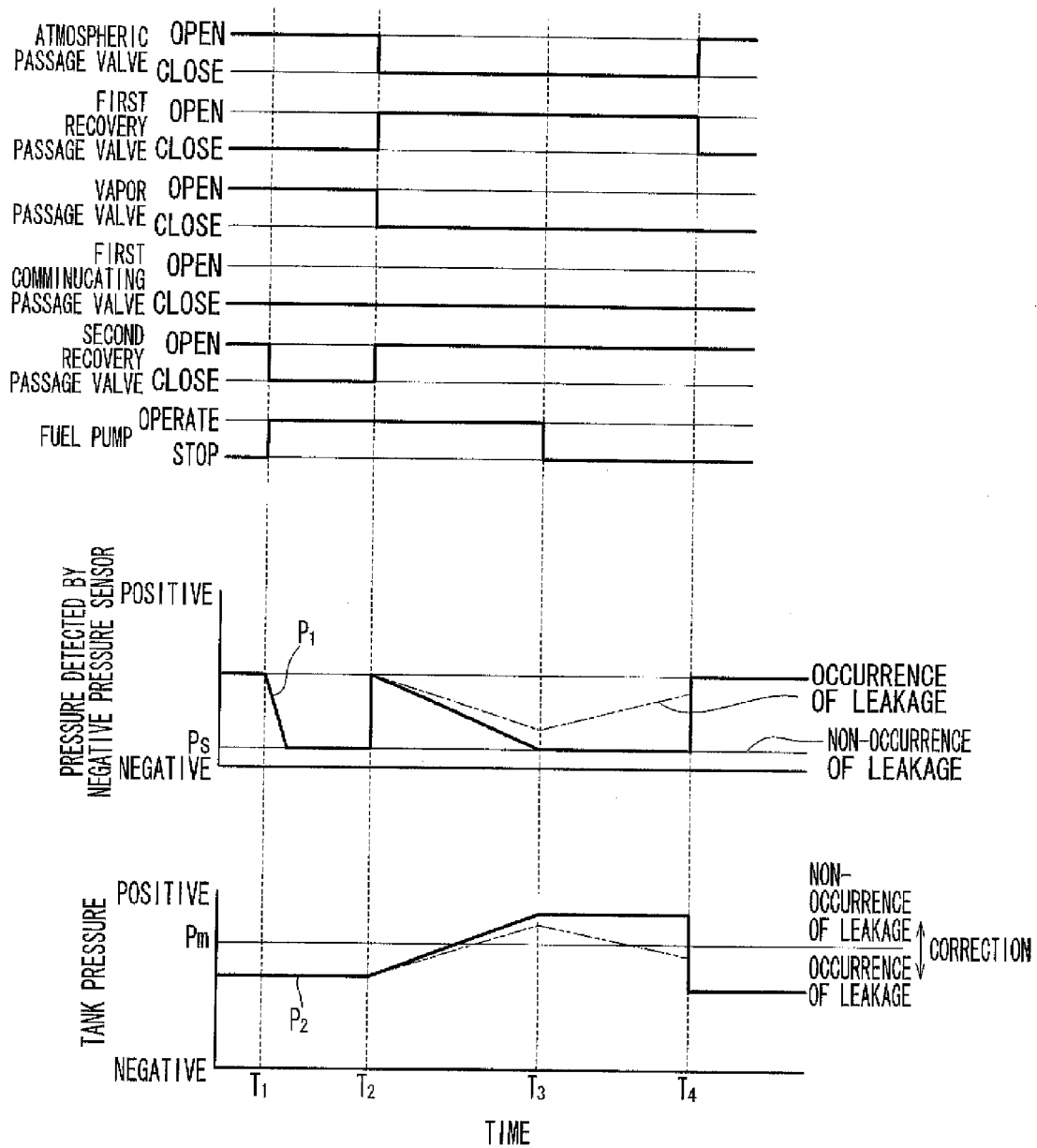
FIG. 12 shows timing charts of opening and closing timings of some of valves of the fuel vapor processing apparatus incorporating a leakage diagnosis device according to a sixth example and graphs showing changes of internal pressures at different parts of the apparatus according to the operations of the valves.

Although a positive pressure is applied by introducing the atmospheric air into the fuel tank 1 in the fifth example, it is possible to apply a positive pressure by introducing gas (a mixture of air and fuel vapor) contained in the first region including the canister 3 into the fuel tank 1. Thus, according to a sixth example, after determining the fuel vapor pressure and storing the saturation negative pressure Ps, the atmospheric passage vale 15 is closed at the same time that the first recovery passage valve 21 and the first communication passage valve 25 are opened at timing T2 as shown in FIG. 12. Therefore, the first region including the canister 3 and the second region including the fuel tank 1 are simultaneously defined as closed spaces. Then, the gas within the first region including the canister 3 is introduced into the fuel tank 1 by the aspirator 8. Therefore, the first region and the second region are simultaneously brought to be negative and positive, respectively, as shown in FIG. 12. In other respect, the sixth example is the same as the fifth example. According to the sixth example, the application of the negative pressure to the first region and the application of the positive pressure to the second region can be simultaneously performed. Therefore, it is possible to minimize the time after application of the pressures to the process system until performing the leakage diagnosis.

POSSIBLE MODIFICATIONS OF FIFTH AND SIXTH EXAMPLES

In the fifth and sixth examples, the leakage diagnosis of the first region is made based on the saturation negative pressure P3. This is based on the assumption that there would be no leakage within a region between the aspirator 8 and the second recovery passage valve 22. Normally, the region between the aspirator 8 and the second recovery passage valve 22 is narrow, and therefore, a possibly of causing leakage from this region is relatively low. However, if leakage occurs from this region, there is a possibility that the detected internal pressure P1 becomes equal to the saturation negative pressure Ps depending on the diagnosis timing. This can be avoided by setting to the ECU 35 a diagnosis criterion (reference pressure) similar to the diagnosis criterion (reference pressure) Pm used for the diagnosis by applying a negative pressure in the first to fourth examples. In such a case, it may be preferable that the diagnosis criterion (reference pressure) is suitably corrected based on the measured fuel vapor pressure.

In addition, also in the case of the fifth and sixth examples, the leakage diagnosis can be made based on the rate of change of pressure during application of the pressure. Thus, for the first region, leakage can be diagnosed based on the rate of decrease of pressure as the negative pressure is applied, and for the second region, leakage can be diagnosed based on the rate of increase of pressure as the positive pressure is applied. It may be also possible to set the diagnosis timing for the first region and the diagnosis timing for the second region to be different from each other. For example, in the case of the fifth example in which the positive pressure is applied to the fuel tank 1 by the introduction of the atmospheric air, it may be possible to diagnose the leakage at a time between timing T3 and timing T4 shown in FIG. 11.

Further, in the case of the fifth and sixth examples incorporating the purge-less evaporation system, it may be possible to omit the first to third communication passages 23, 26 and 38 and the components associated with these passages.

What is claimed is:

1. A leakage diagnosis device for diagnosing leakage from a fuel vapor processing apparatus having a fuel tank, a fuel pump, a canister adsorbing fuel vapor produced within the fuel tank, a fuel vapor desorbing device for desorbing fuel vapor from the canister by applying a negative pressure to the canister, the leakage diagnosis device comprising:

a pressure applying device comprising the fuel vapor desorbing device and capable of applying a pressure to a process system of the fuel vapor processing apparatus;

a pressure detecting device detecting an internal pressure of the process system when the pressure applying device applies a pressure to the process system;

a fuel vapor pressure determining device for determining a fuel vapor pressure, and a leakage determining device determining leakage based on a result of detection of the internal pressure of the process system with reference to a diagnosis reference and capable of correcting the diagnosis reference according to the fuel vapor pressure determined by the fuel vapor pressure determining device, wherein the fuel vapor pressure determining device comprises:

an aspirator having a decompression chamber in which a part of fuel discharged from the fuel pump is introduced for producing a negative pressure;

a negative pressure detecting device for detecting the negative pressure produced by the aspirator, and a fuel vapor pressure calculating device calculating the fuel vapor pressure based on at least the negative pressure detected by the negative pressure detecting device;

wherein the aspirator communicates with the fuel pump via a branch passage that is branched off from a fuel supply passage through which pressurized fuel is fed from the fuel pump to an engine, so that surplus fuel other than the fuel that is introduced into the aspirator via the fuel pump is released into the fuel tank;

wherein a branch passage valve is provided in the branch passage and is configured to open and close the branch passage;

wherein the decompression chamber of the aspirator communicates with the outside of the fuel tank; and wherein the aspirator also serves as the pressure applying device, so that the negative pressure produced by the aspirator is used for introducing an atmospheric air into the fuel tank in order to apply a positive pressure to inside of the fuel tank for diagnosing leakage.

2. The leakage diagnosis device as in claim 1, wherein the fuel vapor pressure determining device further includes a fuel temperature detecting device for detecting a fuel temperature, wherein the fuel vapor pressure calculating device calculates the fuel vapor pressure based on the negative pressure detected by the negative pressure detecting device and the fuel temperature detected by the fuel temperature detecting device.

3. The leakage diagnosis device as in claim 1, wherein:

the decompression chamber of the aspirator communicates with the canister;

the aspirator also serves as the fuel vapor desorbing device, so that fuel vapor adsorbed by the canister is desorbed by the negative pressure produced by the aspirator and is recovered into the fuel tank.

4. The leakage diagnosis device as in claim 3, further comprising a device for interrupting introduction of an atmospheric air into the canister, so that the negative pressure produced by the aspirator is used for introducing air within the canister into the fuel tank, whereby a positive pressure is applied to inside of the fuel tank and to a negative pressure is applied to inside of the canister for diagnosing leakage.

5. A system comprising:

a fuel vapor processing apparatus comprising a fuel tank, a fuel pump, a canister adsorbing fuel vapor produced within the fuel tank, a fuel vapor desorbing device for desorbing fuel vapor from the canister by applying a negative pressure to the canister;

a pressure applying device capable of applying a pressure to a process system of the fuel vapor processing apparatus;

a pressure detecting device detecting an internal pressure of the process system when the pressure applying device applies a pressure to the process system;

a fuel vapor pressure determining device for determining a fuel vapor pressure, and a leakage determining device determining leakage based on a result of detection of the internal pressure of the process system with reference to a diagnosis reference and capable of correcting the diagnosis reference according to the fuel vapor pressure determined by the fuel vapor pressure determining device, wherein the fuel vapor pressure determining device comprises:

an aspirator having a decompression chamber in which a part of fuel discharged from the fuel pump is introduced for producing a negative pressure;

a negative pressure detecting device for detecting the negative pressure produced by the aspirator, and a fuel vapor pressure calculating device calculating the fuel vapor pressure based on the result of detection by the negative pressure detecting device;

wherein the aspirator communicates with the fuel pump via a branch passage that is branched off from a fuel supply passage through which pressurized fuel is fed from the fuel pump to an engine, so that surplus fuel other than the fuel that is introduced into the aspirator via the fuel pump is released into the fuel tank;

wherein a branch passage valve is provided in the branch passage and is configured to open and close the branch passage;

wherein the decompression chamber of the aspirator communicates with the outside of the fuel tank; and wherein the aspirator also serves as the pressure applying device, so that the negative pressure produced by the aspirator is used for introducing an atmospheric air into the fuel tank to apply a positive pressure to inside of the fuel tank for diagnosing leakage.

6. The system as in claim 5, wherein the fuel vapor pressure determining device further includes a fuel temperature detecting device for detecting a fuel temperature, wherein the fuel vapor pressure calculating device calculates the fuel vapor pressure based on the negative pressure detected by the negative pressure detecting device and the fuel temperature detected by the fuel temperature detecting device.

7. The system as in claim 5, wherein:

the decompression chamber of the aspirator communicates with the canister;

the aspirator also serves as the fuel vapor desorbing device, so that fuel vapor adsorbed by the canister is desorbed by the negative pressure produced by the aspirator and is recovered into the fuel tank.

8. The system as in claim 7, further comprising a device for interrupting introduction of an atmospheric air into the canister, so that the negative pressure produced by the aspirator is used for introducing air within the canister into the fuel tank to apply a positive pressure to inside of the fuel tank and to apply a negative pressure to inside of the canister for diagnosing leakage.

9. A leakage diagnosis device for diagnosing leakage from a fuel vapor processing apparatus having a fuel tank, a fuel pump, a canister adsorbing fuel vapor produced within the fuel tank, a fuel vapor desorbing device for desorbing fuel vapor from the canister by applying a negative pressure to the canister, the leakage diagnosis device comprising:

a pressure applying device comprising the fuel vapor desorbing device and capable of applying a pressure to a process system of the fuel vapor processing apparatus;

a pressure detecting device detecting an internal pressure of the process system when the pressure applying device applies a pressure to the process system;

a fuel vapor pressure determining device for determining a fuel vapor pressure, and a leakage determining device determining leakage based on a result of detection of the internal pressure of the process system with reference to a diagnosis reference and capable of correcting the diagnosis reference according to the fuel vapor pressure determined by the fuel vapor pressure determining device, wherein the fuel vapor pressure determining device comprises:

an aspirator having a decompression chamber in which a part of fuel discharged from the fuel pump is introduced for producing a negative pressure;

a negative pressure detecting device for detecting the negative pressure produced by the aspirator, and a fuel vapor pressure calculating device calculating the fuel vapor pressure based on at least the negative pressure detected by the negative pressure detecting device;

wherein the decompression chamber of the aspirator communicates with the outside of the fuel tank;

wherein the aspirator also serves as the pressure applying device, so that the negative pressure produced by the aspirator is used for introducing an atmospheric air into the fuel tank in order to apply a positive pressure to inside of the fuel tank for diagnosing leakage; and wherein the fuel vapor pressure determining device further comprises a device for interrupting introduction of an atmospheric air into the canister, so that the negative pressure produced by the aspirator is used for introducing air within the canister into the fuel tank, whereby a positive pressure is applied to inside of the fuel tank and a negative pressure is applied to inside of the canister for diagnosing leakage.

10. A system comprising:

a fuel vapor processing apparatus comprising a fuel tank, a fuel pump, a canister adsorbing fuel vapor produced within the fuel tank, a fuel vapor desorbing device for desorbing fuel vapor from the canister by applying a negative pressure to the canister;

a pressure applying device capable of applying a pressure to a process system of the fuel vapor processing apparatus;

a pressure detecting device detecting an internal pressure of the process system when the pressure applying device applies a pressure to the process system;

a fuel vapor pressure determining device for determining a fuel vapor pressure, and a leakage determining device determining leakage based on a result of detection of the internal pressure of the process system with reference to a diagnosis reference and capable of correcting the diagnosis reference according to the fuel vapor pressure determined by the fuel vapor pressure determining device, wherein the fuel vapor pressure determining device comprises:

an aspirator having a decompression chamber in which a part of fuel discharged from the fuel pump is introduced for producing a negative pressure;

a negative pressure detecting device for detecting the negative pressure produced by the aspirator, and a fuel vapor pressure calculating device calculating the fuel vapor pressure based on the result of detection by the negative pressure detecting device;

wherein the decompression chamber of the aspirator communicates with the canister;

wherein the aspirator also serves as the fuel vapor desorbing device, so that fuel vapor adsorbed by the canister is desorbed by the negative pressure produced by the aspirator and is recovered into the fuel tank; and wherein the system further comprises a device for interrupting introduction of an atmospheric air into the canister, so that the negative pressure produced by the aspirator is used for introducing air within the canister into the fuel tank to apply a positive pressure to inside of the fuel tank and to apply a negative pressure to inside of the canister for diagnosing leakage.

* * * * *